(12) United States Patent
Nagavarapu et al.

(10) Patent No.: US 10,495,379 B2
(45) Date of Patent: Dec. 3, 2019

(54) REDUCING REFRIGERATION AND DEHYDRATION LOAD FOR A FEED STREAM ENTERING A CRYOGENIC DISTILLATION PROCESS

(71) Applicants: Ananda K. Nagavarapu, Houston, TX (US); P. Scott Northrop, The Woodlands, TX (US); Robert D. Denton, Bellaire, TX (US); James A. Valencia, Houston, TX (US)

(72) Inventors: Ananda K. Nagavarapu, Houston, TX (US); P. Scott Northrop, The Woodlands, TX (US); Robert D. Denton, Bellaire, TX (US); James A. Valencia, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 43 days.

(21) Appl. No.: 15/534,358

(22) PCT Filed: Jan. 13, 2016

(86) PCT No.: PCT/US2016/013182
§ 371 (c)(1),
(2) Date: Jun. 8, 2017

(87) PCT Pub. No.: WO2016/137591
PCT Pub. Date: Sep. 1, 2016

(65) Prior Publication Data
US 2017/0370640 A1 Dec. 28, 2017

Related U.S. Application Data
(60) Provisional application No. 62/126,147, filed on Feb. 27, 2015.

(51) Int. Cl.
*F25J 3/02* (2006.01)
(52) U.S. Cl.
CPC ........... *F25J 3/0209* (2013.01); *F25J 3/0233* (2013.01); *F25J 3/0266* (2013.01);
(Continued)
(58) Field of Classification Search
CPC ........ F25J 3/0209; F25J 3/0233; F25J 3/0266; F25J 2220/68; F25J 2205/30; F25J 3/067;
(Continued)

(56) References Cited

U.S. PATENT DOCUMENTS 2,621,216 A  12/1952  White
2,843,219 A   7/1958  Habgood
(Continued)

FOREIGN PATENT DOCUMENTS

DE  3 149 847  7/1983
EP  0 133 208  2/1985
(Continued)

OTHER PUBLICATIONS

Aaron, D. et al. (2005) "Separation of $CO_2$ from Flue Gas: A Review," *Separation Science and Technology*, 40, pp. 321-348.
(Continued)

*Primary Examiner* — Ljiljana V. Ciric
(74) *Attorney, Agent, or Firm* — ExxonMobil Upstream Research Company—Law Department

(57) ABSTRACT

A system for conditioning a sour gas feed stream for a cryogenic distillation tower. A dehydration unit separates the sour gas feed stream into a first stream including water and a feed stream. A sequential cooling assembly is coupled to both the dehydration unit and the cryogenic distillation tower. The sequential cooling assembly includes: a first stage that separates the feed stream into a partially cooled feed stream and a second stream including acid gas; a second
(Continued)

stage that cools the partially cooled feed stream into a cooled feed stream and a third stream including acid gas; and a cooled feed stream header coupled to a cryogenic distillation tower feed inlet. The first stage, the second stage, or both send at least one of the second and third streams to a bottom section of the cryogenic distillation tower.

12 Claims, 7 Drawing Sheets

(52) U.S. Cl.
CPC ........ *F25J 2200/02* (2013.01); *F25J 2200/30* (2013.01); *F25J 2200/50* (2013.01); *F25J 2200/74* (2013.01); *F25J 2200/94* (2013.01); *F25J 2205/04* (2013.01); *F25J 2205/20* (2013.01); *F25J 2205/30* (2013.01); *F25J 2205/40* (2013.01); *F25J 2205/50* (2013.01); *F25J 2210/04* (2013.01); *F25J 2220/68* (2013.01); *F25J 2240/02* (2013.01); *F25J 2240/40* (2013.01); *F25J 2245/02* (2013.01); *F25J 2270/90* (2013.01); *F25J 2280/40* (2013.01)

(58) Field of Classification Search
CPC .. F25J 2205/31; F25J 2205/32; F25J 2205/40; F25J 2220/84; F25J 2270/90; F25J 2240/40; F25J 2240/02; F25J 2210/04; F25J 2200/94; F25J 2200/74; F25J 2200/50; F25J 2200/30; F25J 2200/02; F25J 2280/40; F25J 2245/02; F25J 2205/50; F25J 2205/20; F25J 2205/04; Y02C 10/12
See application file for complete search history.

(56) References Cited

U.S. PATENT DOCUMENTS

| | | | |
|---|---|---|---|
| 2,863,527 A | 12/1958 | Herbert | |
| 2,960,837 A | 11/1960 | Swenson et al. | |
| 3,050,950 A | 8/1962 | Karwat et al. | |
| 3,109,726 A | 11/1963 | Karwat | |
| 3,349,571 A | 10/1967 | Nebgen | |
| 3,393,527 A | 7/1968 | Swensen et al. | |
| 3,400,512 A | 9/1968 | McKay | |
| 3,421,984 A | 1/1969 | Jensen et al. | |
| 3,498,067 A * | 3/1970 | Gerhard | F25J 3/0219 |
| | | | 423/226 |
| 3,683,634 A | 8/1972 | Streich | |
| 3,705,625 A | 12/1972 | Whitten et al. | |
| 3,767,766 A | 10/1973 | Tjoa et al. | |
| 3,824,080 A | 7/1974 | Smith et al. | |
| 3,842,615 A | 10/1974 | Reigel et al. | |
| 3,848,427 A | 11/1974 | Loofbourow | |
| 3,895,101 A | 7/1975 | Tsuruta | |
| 3,929,635 A | 12/1975 | Buriks et al. | |
| 3,933,001 A | 1/1976 | Muska | |
| 4,129,626 A | 12/1978 | Mellbom | |
| 4,246,015 A | 1/1981 | Styring | |
| 4,270,937 A | 6/1981 | Adler | |
| 4,280,559 A | 7/1981 | Best | |
| 4,281,518 A | 8/1981 | Muller et al. | |
| 4,318,723 A | 3/1982 | Holmes et al. | |
| 4,319,964 A | 3/1982 | Katz et al. | |
| 4,336,233 A | 6/1982 | Appl et al. | |
| 4,344,485 A | 8/1982 | Butler | |
| 4,370,156 A * | 1/1983 | Goddin, Jr. | F25J 3/0209 |
| | | | 208/189 |
| 4,382,912 A | 5/1983 | Madgavkar et al. | |
| 4,383,841 A | 5/1983 | Ryan et al. | |
| 4,405,585 A | 9/1983 | Sartori et al. | |
| 4,417,449 A * | 11/1983 | Hegarty | C10G 1/002 |
| | | | 62/622 |
| 4,417,909 A | 11/1983 | Weltmer | |
| 4,421,535 A | 12/1983 | Mehra | |
| 4,441,900 A | 4/1984 | Swallow | |
| 4,459,142 A | 7/1984 | Goddin | |
| 4,462,814 A | 7/1984 | Holmes et al. | |
| 4,466,946 A | 8/1984 | Goddin et al. | |
| 4,511,382 A | 4/1985 | Valencia et al. | |
| 4,512,782 A | 4/1985 | Bauer et al. | |
| 4,533,372 A | 8/1985 | Valencia et al. | |
| 4,551,158 A | 11/1985 | Wagner et al. | |
| 4,563,202 A | 1/1986 | Yao et al. | |
| 4,592,766 A | 6/1986 | Kumman et al. | |
| 4,602,477 A | 7/1986 | Lucadamo | |
| 4,609,388 A | 9/1986 | Adler et al. | |
| 4,636,334 A | 1/1987 | Skinner et al. | |
| 4,695,672 A | 9/1987 | Bunting | |
| 4,697,642 A | 10/1987 | Vogel | |
| 4,710,213 A | 12/1987 | Sapper et al. | |
| 4,717,408 A | 1/1988 | Hopewell | |
| 4,720,294 A | 1/1988 | Lucadamo et al. | |
| 4,747,858 A | 5/1988 | Gottier | |
| 4,756,730 A * | 7/1988 | Stupin | F25J 3/0219 |
| | | | 62/620 |
| 4,761,167 A | 8/1988 | Nicholas et al. | |
| 4,762,543 A | 8/1988 | Pantermuehl et al. | |
| 4,769,054 A | 9/1988 | Steigman | |
| 4,822,393 A | 4/1989 | Markbreiter et al. | |
| 4,831,206 A | 5/1989 | Zarchy | |
| 4,923,493 A | 5/1990 | Valencia et al. | |
| 4,927,498 A | 5/1990 | Rushmere | |
| 4,935,043 A | 6/1990 | Blanc et al. | |
| 4,954,220 A | 9/1990 | Rushmere | |
| 4,972,676 A | 11/1990 | Sakai | |
| 4,976,849 A | 12/1990 | Soldati | |
| 5,011,521 A | 4/1991 | Gottier | |
| 5,062,270 A | 11/1991 | Haut et al. | |
| 5,120,338 A | 6/1992 | Potts et al. | |
| 5,137,550 A | 8/1992 | Hegarty et al. | |
| 5,152,927 A | 10/1992 | Rivers | |
| 5,233,837 A | 8/1993 | Callahan | |
| 5,240,472 A | 8/1993 | Sircar | |
| 5,247,087 A | 9/1993 | Rivers | |
| 5,265,428 A | 11/1993 | Valencia et al. | |
| 5,335,504 A | 8/1994 | Durr et al. | |
| 5,345,771 A | 9/1994 | Dinsmore | |
| 5,567,396 A | 10/1996 | Perry et al. | |
| 5,620,144 A | 4/1997 | Strock et al. | |
| 5,626,034 A * | 5/1997 | Manley | C07C 7/04 |
| | | | 62/623 |
| 5,643,460 A | 7/1997 | Marble et al. | |
| 5,700,311 A | 12/1997 | Spencer | |
| 5,720,929 A | 2/1998 | Minkkinen et al. | |
| 5,819,555 A | 10/1998 | Engdahl | |
| 5,820,837 A | 10/1998 | Marjanovich et al. | |
| 5,899,274 A | 5/1999 | Frauenfeld et al. | |
| 5,956,971 A | 9/1999 | Cole et al. | |
| 5,964,985 A | 10/1999 | Wootten | |
| 5,983,663 A | 11/1999 | Sterner | |
| 6,053,007 A * | 4/2000 | Victory | F25J 3/0209 |
| | | | 62/619 |
| 6,053,484 A | 4/2000 | Fan et al. | |
| 6,082,133 A | 7/2000 | Barclay et al. | |
| 6,082,373 A | 7/2000 | Sakurai et al. | |
| 6,162,262 A | 12/2000 | Minkkinen et al. | |
| 6,223,557 B1 | 5/2001 | Cole | |
| 6,240,744 B1 | 6/2001 | Agrawal et al. | |
| 6,267,358 B1 | 7/2001 | Gohara et al. | |
| 6,270,557 B1 | 8/2001 | Millet et al. | |
| 6,274,112 B1 | 8/2001 | Moffett et al. | |
| 6,301,927 B1 * | 10/2001 | Reddy | F25J 3/0209 |
| | | | 62/619 |
| 6,336,334 B1 | 1/2002 | Minkkinen et al. | |
| 6,374,634 B2 | 4/2002 | Gallarda et al. | |
| 6,401,486 B1 | 6/2002 | Lee et al. | |
| 6,416,729 B1 | 7/2002 | DeBerry et al. | |
| 6,442,969 B1 | 9/2002 | Rojey et al. | |

(56) References Cited

U.S. PATENT DOCUMENTS

| | | | |
|---|---|---|---|
| 6,500,241 B2 * | 12/2002 | Reddy | B01D 53/047 62/617 |
| 6,500,982 B1 | 12/2002 | Hale et al. | |
| 6,505,683 B2 | 1/2003 | Minkkinen et al. | |
| 6,516,631 B1 | 2/2003 | Trebble | |
| 6,517,801 B2 | 2/2003 | Watson et al. | |
| 6,539,747 B2 | 4/2003 | Minta et al. | |
| 6,565,629 B1 | 5/2003 | Hayashida et al. | |
| 6,605,138 B2 | 8/2003 | Frondorf | |
| 6,631,626 B1 | 10/2003 | Hahn | |
| 6,632,266 B2 | 10/2003 | Thomas et al. | |
| 6,662,872 B2 | 12/2003 | Gutek et al. | |
| 6,708,759 B2 | 3/2004 | Leaute et al. | |
| 6,711,914 B2 | 3/2004 | Lecomte | |
| 6,735,979 B2 | 5/2004 | Lecomte et al. | |
| 6,755,251 B2 | 6/2004 | Thomas et al. | |
| 6,755,965 B2 | 6/2004 | Pironti et al. | |
| 6,818,194 B2 | 11/2004 | DeBerry et al. | |
| 6,883,327 B2 | 4/2005 | Iijima et al. | |
| 6,946,017 B2 | 9/2005 | Leppin et al. | |
| 6,958,111 B2 | 10/2005 | Rust et al. | |
| 6,962,061 B2 | 11/2005 | Wilding et al. | |
| 7,001,490 B2 | 2/2006 | Wostbrock et al. | |
| 7,004,985 B2 | 2/2006 | Wallace et al. | |
| 7,066,986 B2 | 6/2006 | Haben et al. | |
| 7,073,348 B2 | 7/2006 | Clodic et al. | |
| 7,121,115 B2 | 10/2006 | Lemaire et al. | |
| 7,128,150 B2 | 10/2006 | Thomas et al. | |
| 7,128,276 B2 | 10/2006 | Nilsen et al. | |
| 7,152,431 B2 | 12/2006 | Amin et al. | |
| 7,211,128 B2 | 5/2007 | Thomas et al. | |
| 7,211,701 B2 | 5/2007 | Muller et al. | |
| 7,219,512 B1 | 5/2007 | Wilding et al. | |
| 7,285,225 B2 | 10/2007 | Copeland et al. | |
| 7,325,415 B2 | 2/2008 | Amin et al. | |
| 7,424,808 B2 | 9/2008 | Mak | |
| 7,437,889 B2 | 10/2008 | Roberts et al. | |
| 7,442,231 B2 | 10/2008 | Landrum | |
| 7,442,233 B2 | 10/2008 | Mitariten | |
| 7,493,779 B2 | 2/2009 | Amin | |
| 7,536,873 B2 | 5/2009 | Nohlen | |
| 7,550,064 B2 | 6/2009 | Bassler et al. | |
| 7,575,624 B2 | 8/2009 | Cartwright et al. | |
| 7,597,746 B2 | 10/2009 | Mak et al. | |
| 7,635,408 B2 | 12/2009 | Mak et al. | |
| 7,637,984 B2 | 12/2009 | Adamopoulos | |
| 7,637,987 B2 | 12/2009 | Mak | |
| 7,641,717 B2 | 1/2010 | Gal | |
| 7,662,215 B2 | 2/2010 | Sparling et al. | |
| 7,691,239 B2 | 4/2010 | Kister et al. | |
| 7,722,289 B2 | 5/2010 | Leone et al. | |
| 7,729,976 B2 | 6/2010 | Hill et al. | |
| 7,770,872 B2 | 8/2010 | Delatour | |
| 7,795,483 B2 | 9/2010 | Kulprathipanja et al. | |
| 7,806,965 B2 * | 10/2010 | Stinson | B01D 53/002 208/308 |
| 7,814,975 B2 | 10/2010 | Hagen et al. | |
| 7,879,135 B2 | 2/2011 | Ravikumar et al. | |
| 7,901,583 B2 | 3/2011 | McColl et al. | |
| 7,927,573 B2 * | 4/2011 | Degenstein | B01D 53/002 422/168 |
| 7,955,496 B2 | 6/2011 | Iqbal et al. | |
| 8,002,498 B2 | 8/2011 | Leone et al. | |
| 8,020,408 B2 | 9/2011 | Howard et al. | |
| 8,133,764 B2 | 3/2012 | Dirks et al. | |
| 8,136,799 B2 | 3/2012 | Griepsma | |
| 8,303,685 B2 | 11/2012 | Schubert et al. | |
| 8,308,849 B2 | 11/2012 | Gal | |
| 8,312,738 B2 | 11/2012 | Singh et al. | |
| 8,372,169 B2 | 2/2013 | Tsangaris et al. | |
| 8,381,544 B2 | 2/2013 | Coyle | |
| 8,388,832 B2 | 3/2013 | Moffett et al. | |
| 8,428,835 B2 | 4/2013 | Habert et al. | |
| 8,475,572 B2 | 7/2013 | Prast et al. | |
| 8,500,105 B2 | 8/2013 | Nieuwoudt | |
| 8,529,662 B2 | 9/2013 | Kelley et al. | |
| 9,423,174 B2 * | 8/2016 | Northrop | C10L 3/10 |
| 9,803,918 B2 * | 10/2017 | Valencia | F25J 1/0022 |
| 9,823,016 B2 * | 11/2017 | Valencia | C07C 7/05 |
| 9,823,017 B2 * | 11/2017 | Denton | F25J 3/067 |
| 9,829,246 B2 * | 11/2017 | Northrop | C10L 3/102 |
| 9,829,247 B2 * | 11/2017 | Valencia | C07C 7/05 |
| 9,869,511 B2 * | 1/2018 | Valencia | C07C 7/05 |
| 9,874,395 B2 * | 1/2018 | Valencia | F25J 1/0022 |
| 9,874,396 B2 * | 1/2018 | Valencia | C07C 7/05 |
| 10,006,700 B2 * | 6/2018 | Urbanski | F25J 3/0295 |
| 10,139,158 B2 * | 11/2018 | Valencia | C07C 7/05 |
| 10,222,121 B2 * | 3/2019 | Cullinane | B01D 7/02 |
| 10,281,205 B2 * | 5/2019 | Urbanski | F25J 3/0233 |
| 10,408,534 B2 * | 9/2019 | Kaminsky | F25J 1/00 |
| 2002/0174687 A1 | 11/2002 | Cai | |
| 2002/0189443 A1 | 12/2002 | McGuire | |
| 2003/0181772 A1 | 9/2003 | Meyer et al. | |
| 2006/0207946 A1 | 9/2006 | McColl et al. | |
| 2006/0239879 A1 | 10/2006 | Lallemand et al. | |
| 2007/0056317 A1 | 3/2007 | Amin et al. | |
| 2007/0144943 A1 | 6/2007 | Lemaire et al. | |
| 2007/0277674 A1 | 12/2007 | Hirano et al. | |
| 2008/0034789 A1 | 2/2008 | Fieler et al. | |
| 2008/0091316 A1 | 4/2008 | Szczublewski | |
| 2008/0092589 A1 | 4/2008 | Trainer et al. | |
| 2008/0307827 A1 | 12/2008 | Hino et al. | |
| 2009/0023605 A1 | 1/2009 | Lebl et al. | |
| 2009/0220406 A1 | 9/2009 | Rahman | |
| 2010/0011809 A1 | 1/2010 | Mak | |
| 2010/0018248 A1 | 1/2010 | Fieler et al. | |
| 2010/0024472 A1 | 2/2010 | Amin et al. | |
| 2010/0064725 A1 | 3/2010 | Chieng et al. | |
| 2010/0107687 A1 | 5/2010 | Andrian et al. | |
| 2010/0132405 A1 | 6/2010 | Nilsen | |
| 2010/0147022 A1 | 6/2010 | Hart et al. | |
| 2010/0187181 A1 | 7/2010 | Sortwell | |
| 2010/0310439 A1 | 12/2010 | Brok et al. | |
| 2011/0132034 A1 | 6/2011 | Beaumont et al. | |
| 2011/0154856 A1 | 6/2011 | Andrian et al. | |
| 2011/0168019 A1 | 7/2011 | Northrop et al. | |
| 2011/0192190 A1 | 8/2011 | Andrian et al. | |
| 2011/0265512 A1 | 11/2011 | Bearden et al. | |
| 2012/0006055 A1 | 1/2012 | Van Santen et al. | |
| 2012/0031143 A1 | 2/2012 | Van Santem et al. | |
| 2012/0031144 A1 | 2/2012 | Northrop et al. | |
| 2012/0047943 A1 * | 3/2012 | Barclay | C10L 3/10 62/613 |
| 2012/0079852 A1 * | 4/2012 | Northrop | C07C 7/005 62/620 |
| 2012/0125043 A1 | 5/2012 | Cullinane et al. | |
| 2012/0204599 A1 | 8/2012 | Northrop et al. | |
| 2012/0279728 A1 | 11/2012 | Northrop et al. | |
| 2013/0032029 A1 | 2/2013 | Mak | |
| 2013/0074541 A1 | 3/2013 | Kaminsky et al. | |
| 2013/0098105 A1 | 4/2013 | Northrop | |
| 2013/0247766 A1 * | 9/2013 | Oppenheim | B01D 53/1406 96/234 |
| 2013/0269386 A1 * | 10/2013 | Brostow | F25J 1/0022 62/613 |
| 2014/0137599 A1 | 5/2014 | Oelfke et al. | |
| 2015/0158796 A1 | 6/2015 | Valencia et al. | |
| 2015/0159939 A1 | 6/2015 | Valencia et al. | |
| 2015/0159940 A1 | 6/2015 | Valencia et al. | |
| 2015/0159941 A1 | 6/2015 | Valencia et al. | |
| 2015/0159942 A1 | 6/2015 | Valencia et al. | |
| 2015/0159943 A1 | 6/2015 | Valencia et al. | |
| 2015/0159944 A1 | 6/2015 | Valencia et al. | |
| 2015/0159945 A1 | 6/2015 | Valencia et al. | |
| 2015/0159946 A1 | 6/2015 | Valencia et al. | |
| 2015/0159947 A1 | 6/2015 | Valencia et al. | |
| 2017/0370640 A1 * | 12/2017 | Nagavarapu | F25J 3/0233 |
| 2018/0017319 A1 * | 1/2018 | Mak | B01D 53/1456 |

FOREIGN PATENT DOCUMENTS

| | | |
|---|---|---|
| EP | 0 508 244 | 10/1992 |
| EP | 1 338 557 | 3/2005 |

(56) References Cited

FOREIGN PATENT DOCUMENTS

| | | |
|---|---|---|
| GB | 1010403 | 11/1965 |
| WO | WO 2002/032536 | 4/2002 |
| WO | WO 2002/039038 | 5/2002 |
| WO | WO 2004/047956 | 6/2004 |
| WO | WO 2008/034789 | 3/2008 |
| WO | WO 2008/095258 | 8/2008 |
| WO | WO 2008/152030 | 12/2008 |
| WO | WO 2009/023605 | 2/2009 |
| WO | WO 2009/029353 | 3/2009 |
| WO | WO 2009/087206 | 7/2009 |
| WO | WO 2010/023238 | 3/2010 |
| WO | WO 2010/052299 | 5/2010 |
| WO | WO 2010/136442 | 12/2010 |
| WO | WO 2011/026170 | 3/2011 |
| WO | WO 2013/095828 | 6/2013 |
| WO | WO 2013/142100 | 9/2013 |

OTHER PUBLICATIONS

Amin, R. (2003) "Advanced Mini Natural Gas Liquefier," *LNG Journal*, Mar.-Apr. 2003, pp. 20-23.

Black, S. (2006) "Chilled Ammonia Process for CO2 Capture," *Alstom Position Paper*, Nov. 2006, 6 pgs.

Ciulla, Vincent (2007) "How the Engine Works," About.com, Mar. 21, 2007, [retrieved from the internet on Aug. 17, 2012]. <URL: http://autorepair.about.com/cs/generalinfo/a/aa060500a.html>.

"Cryogenics" *Science Clarified*, May 2, 2006 [retrieved from the internet on Aug. 17, 2012]. <URL: http://www.scienceclarified.com/Co-Di/Cryogenics.html>.

Denton, R. D. et al. (1985) "Integrated Low Temperature Processing of Sour Natural Gas," *Gas Processors Assoc.*, $64^{th}$ Ann. Conv., pp. 92-96.

Guccione, E. (1963) "New Approach to Recovery of Helium from Natural Gas," *Chem. Engr.*, Sep. 30, 1963, pp. 76-78.

Hassan, S. M. N. (2005) "Techno-Economic Study of $CO_2$ Capture Process for Cement Plants," *University of Waterloo—Thesis*.

Haut, R. C. et al. (1988) "Development and Application of the Controlled Freeze Zone Process," *SPE 17757, SPE Gas Tech. Symp.*—Dallas, TX, pp. 435-443.

Haut, R. C. et al. (1988) "Development and Application of the Controlled Freeze Zone Process," *OSEA 88197, $7^{th}$ Offshore So. East Asia Conf.*, Singapore, Feb. 1988, pp. 840-848.

Haut, R. C. et al. (1989) "Development and Application of the Controlled Freeze Zone Process," *SPE Production Engineering*, Aug. 1989, pp. 265-271.

Im, U. K. et al. (1971) "Heterogeneous Phase Behavior of Carbon Dioxide in n-Hexane and n-Heptane at Low Temperatures," *Jrnl. of Chem. Engineering Data*, v.16.4, pp. 412-415.

Mitariten, M. et al. (2007) "The Sorbead™ Quick-Cycle Process for Simultaneous Removal of Water, Heavy Hydrocarbons and Mercaptans from Natural Gas," *Laurance Reid Gas Conditioning Conf.*, Feb. 25-27, 2007.

Northrop, P. Scott et al. (2004) "Cryogenic Sour Gas Process Attractive for Acid Gas Injection Applications," $83^{rd}$ *Ann. Gas Processors Assoc. Convention*, New Orleans, LA., pp. 1-8 (XP007912217).

Pagcatipunan, C. et al. (2005) "Maximize the Performance of Spray Nozzle Systems," *CEP Magazine*, Dec. 2005, pp. 38-44.

Reyes, S. C. et al. (1997) "Frequency Modulation Methods for Diffusion and Adsorption Measurements in Porous Solids," *J. Phys. Chem. B*, v. 101, pp. 614-622.

Rubin, E. S. et al. (2002) "A Technical, Economic and Environmental Assessment of Amine-based CO2 Capture Technology for Power Plant Greenhouse Gas Control," *U.S. Dept. of Energy*, Oct. 2002, DOE/DE-FC26-00NT40935, 26 pages.

Spero, C. (2007) "Callide Oxyfuel Project," *CS Energy, cLET Seminar*, Jul. 12, 2007, 9 pages.

Thomas, E. R. et al. (1987) "Conceptual Studies Using the Controlled Freeze Zone (CFZ) Process," *AlChE Summer Nat'l Mtg.*, Aug. 16-19, 1987.

Thomas, E. R. et al. (1988) "Conceptual Studies for $CO_2$/Natural Gas Separation Using the Control Freeze Zone (CFZ) Process," *Gas Separation and Purification*, v. 2, pp. 84-89.

Valencia, J. A. et al. (2008) "Controlled Freeze Zone™ Technology for Enabling Processing of High $CO_2$ and $H_2S$ Gas Reserves," SPE-IPTC 12708, Kuala Lumpur, IN, v.4.1, Jan. 2008, pp. 2358-2363.

Victory, D. J. et al. (1987) "The CFZ Process: Direct Methane-Carbon Dioxide Fractionation," $66^{th}$*Ann. GPA Convention*, Mar. 16-18, Denver, CO.

Wilson, R.W. et al. (1968) "Helium: Its Extraction and Purification," *Journ. Petrol. Tech.*, v. 20, pp. 341-344.

\* cited by examiner

REDUCING REFRIGERATION AND DEHYDRATION LOAD FOR A FEED STREAM ENTERING A CRYOGENIC DISTILLATION PROCESS

CROSS REFERENCE TO RELATED APPLICATIONS

This application is a National Stage Application of International Application No. PCT/US2016/013182, filed Jan. 13, 2016, which claims the benefit of U.S. Provisional Patent Application 62/126,147 filed Feb. 27, 2015 entitled REDUCING REFRIGERATION AND DEHYDRATION LOAD FOR A FEED STREAM ENTERING A CRYOGENIC DISTILLATION PROCESS, the entirety of which is incorporated by reference herein.

BACKGROUND

Fields of Disclosure

The disclosure relates generally to the field of fluid separation. More specifically, the disclosure relates to the cryogenic separation of contaminants, such as acid gas, from a hydrocarbon.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as admissions of prior art.

The production of natural gas hydrocarbons, such as methane and ethane, from a reservoir oftentimes carries with it the incidental production of non-hydrocarbon gases. Such gases include contaminants, such as at least one of carbon dioxide ("$CO_2$"), hydrogen sulfide ("$H_2S$"), carbonyl sulfide, carbon disulfide, and various mercaptans. When a feed stream being produced from a reservoir includes these contaminants mixed with hydrocarbons, the stream is oftentimes referred to as "sour gas."

Many natural gas reservoirs have relatively low percentages of hydrocarbons and relatively high percentages of contaminants. Contaminants may act as a diluent and lower the heat content of hydrocarbons. Additionally, some contaminants can become quite corrosive in the presence of water.

It is usually desirable to remove contaminants from a stream containing hydrocarbons to produce sweet and concentrated hydrocarbons. Specifications for pipeline quality natural gas may call for a maximum of 2-4% $CO_2$ and ¼ grain $H_2S$ per 100 standard cubic foot (scf) (4 parts per million by volume (ppmv)) or 5 milligrams per normal cubic meter (mg/Nm$^3$) $H_2S$. Specifications for lower temperature processes such as natural gas liquefaction plants or nitrogen rejection units may require less than 50 parts per million (ppm) $CO_2$.

The separation of contaminants from hydrocarbons is difficult and consequently significant work has been applied to the development of hydrocarbon/contaminant separation methods. These methods can be placed into three general classes: absorption by solvents (physical, chemical and hybrids), adsorption by solids, and distillation.

Separation by distillation of some mixtures can be relatively simple and, as such, is widely used in the natural gas industry. However, distillation of mixtures of natural gas hydrocarbons, primarily methane, and one of the most common contaminants in natural gas, carbon dioxide, can present significant difficulties. Conventional distillation principles and conventional distillation equipment assume the presence of only vapor and liquid phases throughout the distillation tower. However, the separation of $CO_2$ from methane by distillation involves temperature and pressure conditions that result in solidification of $CO_2$ if a pipeline or better quality hydrocarbon product is desired. The cold temperatures generally required for these distillation techniques are typically referred to as cryogenic temperatures.

Certain cryogenic distillations provide the appropriate mechanism to handle the formation and subsequent melting of solids during the separation of solid-forming contaminants from hydrocarbons. For example, the formation of solid contaminants in equilibrium with vapor-liquid mixtures of hydrocarbons and contaminants at particular conditions of temperature and pressure can take place in a controlled freeze zone section. Additional and/or alternative cryogenic separation systems are known in the art, e.g., systems solidifying $CO_2$ outside of a distillation tower, and the disclosure below expressly contemplates and includes such alternate systems.

Historic cryogenic distillations conditioned feed gas prior to admission to the cryogenic distillation column. The feed gas conditioning generally includes two principal steps: (1) removal of sufficient amounts of moisture, and (2) chilling the feed to an appropriate temperature before introduction into the cryogenic process.

The water content of feed streams has historically been a matter for concern, as sufficient amounts of moisture may cause hydrate formation in the colder regions of the cryogenic distillation process. Historic cryogenic distillations feed conditioning configurations first fed wet, sour gas to a dehydration unit, e.g., comprising one or more molecular sieves, in order to remove the bulk of the water from the feed. Dehydration may be important since routing moisture rich liquid streams through cold temperatures in the process risks formation of solid ice or hydrates. However, molecular sieves are typically expensive and heavy, reducing their practicality for many applications, e.g., offshore applications.

Lowering the temperature of feed streams may also be important. Historically, feed conditioning systems couple a chiller (or a chilling train with cascaded chillers operating in series) between the dehydration unit and the cryogenic distillation column to cool the feed gas prior to reaching the cryogenic distillation column. Chilling the feed gas may minimize the refrigeration load on the reflux generation system in the cryogenic distillation column.

In the course of chilling the feed stream, some $H_2S$ and $CO_2$, when in sufficient concentration in the feed gas may condense. Further chilling of the feed gas stream forms additional liquid. The condensed liquids may dissolve a certain amount of water. The condensed liquid stream may also comprise some methane and heavier hydrocarbons, such as, ethane, propane, etc. The feed conditioning configurations may route the liquid stream to the lower portion of the cryogenic distillation column. The lower portion of the cryogenic distillation column may strip out residual methane and may inject the acid liquid stream, which may contain dissolved water, into a spent reservoir via acid gas injection (AGI) or may use the acid liquid stream as a miscible Enhanced Oil Recovery (EOR) fluid. The overhead (treated) gas from the cryogenic distillation system may be sent to a pipeline or a liquefied natural gas (LNG) train for liquefaction.

The above discussion may indicate that colder feed chilling temperatures are preferable as this increases the amount of fluid condensed during feed conditioning. However, the moisture carrying capacity of a unit of a condensed liquid decreases with decreasing temperature. Therefore, the total moisture dissolved in the liquid may actually be lower at lower temperatures, even though the amount of liquid generated is higher. Further, the moisture bearing capacity of a unit of vapor also decreases with decreasing temperature. Therefore, as the feed gas containing a certain amount of moisture is chilled, the resulting vapor cannot hold as much moisture. Normally, when a low temperature vapor cannot hold as much moisture, the excess moisture may condense and dissolve in the $CO_2$-rich liquid. However, when the $CO_2$-rich liquid is saturated with water, additional moisture cannot be dissolved and a solid precipitate (e.g., ice or hydrate) may be formed.

Consequently, a need exists for a low-cost way to dehydrate and cool a feed stream, and in particular to sufficiently dry and cool the feed stream to avoid forming solid precipitates. In view of the discussion above, a need exists for improved feed conditioning technology that reduces the required level of upstream dehydration. A need exists for a more efficient feed conditioning technology that lowers the capital and operating costs of the present feed conditioning technologies. A need exists for a feed conditioning technique to lower overall energy requirement.

SUMMARY

The present disclosure provides techniques for reducing the refrigeration load and dehydration requirements for a sour gas feed stream entering a cryogenic distillation column.

In one embodiment, the disclosure includes a system for conditioning a sour gas feed stream for a cryogenic distillation tower, comprising a dehydration unit configured to separate the sour gas feed stream into a first stream comprising water and a feed stream, and a sequential cooling assembly coupled to both the dehydration unit and the cryogenic distillation tower, wherein the sequential cooling assembly comprises a first stage configured to separate the feed stream into a partially cooled feed stream and a second stream comprising acid gas, a second stage configured to cool the partially cooled feed stream into a cooled feed stream and a third stream comprising acid gas, and a cooled feed stream header coupled to a cryogenic distillation tower feed inlet, wherein the first stage, the second stage, or both are configured to send at least one of the second and third streams to a bottom section of the cryogenic distillation tower.

In another embodiment, the disclosure includes a method of sequential cooling a sour gas feed stream for a cryogenic distillation tower, comprising receiving the sour gas feed stream, separating the sour gas feed stream into a water stream and a partially dehydrated feed stream, passing the partially dehydrated feed stream to a sequential cooling assembly, cooling the partially dehydrated feed stream to a first temperature, separating the partially dehydrated feed stream into a partially cooled feed stream comprising substantially vapor and a first stream comprising substantially liquid, cooling the partially cooled feed stream to a second temperature, separating the partially cooled feed stream into a cooled feed stream comprising substantially vapor and a second stream comprising substantially liquid, and feeding the cooled feed stream to the cryogenic distillation tower.

In still another embodiment, the disclosure includes a cryogenic distillation system, comprising a progressive conditioning section for a sour gas feed stream, comprising a first stage assembly configured to separate the sour gas feed stream into a first stream comprising water and a partially dehydrated feed stream, and a second stage assembly coupled to the first stage assembly and configured to separate the partially dehydrated feed stream into a progressively dehydrated feed stream comprising a hydrocarbon and a second stream comprising an acid gas, and further configured to cool the progressively dehydrated feed stream to a first temperature, and a third stage assembly coupled to the second stage assembly and further configured to cool the progressively dehydrated feed stream to a second temperature, wherein the second temperature is colder than the first temperature, and a cryogenic distillation tower comprising a controlled freeze zone, wherein the cryogenic distillation tower is configured to receive the progressively dehydrated feed stream.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
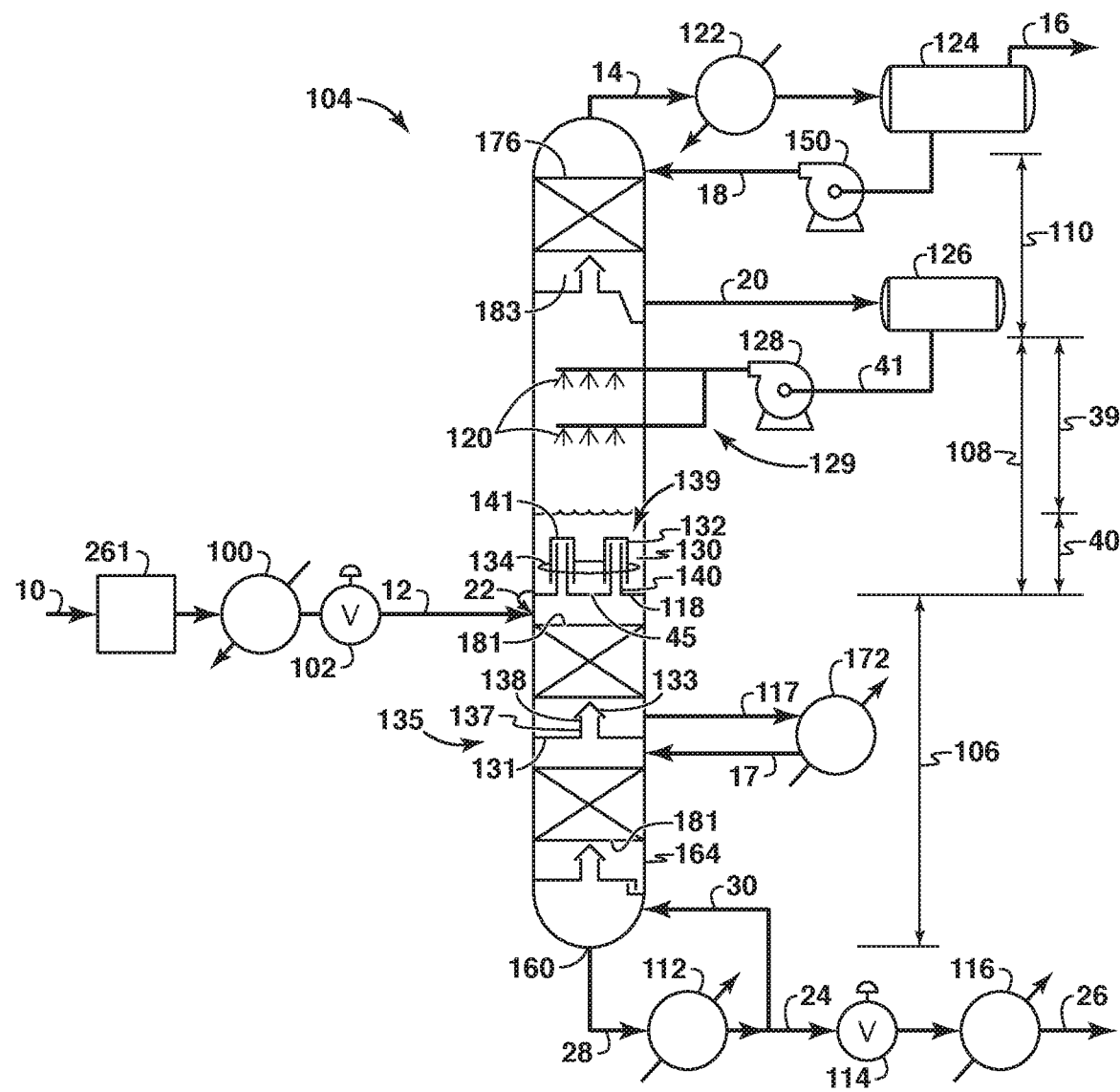
FIG. 1 is a schematic diagram of a tower with sections within a single vessel.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

As referenced in this application, the terms "gas stream," "vapor stream," and "liquid stream" may refer to different stages of a feed stream as the feed stream is processed in a distillation tower that separates methane, the primary hydrocarbon in natural gas, from contaminants. Although the phrases "gas stream," "vapor stream," and "liquid stream," refer to situations where a gas, vapor, and liquid is mainly present in the stream, respectively, there may be other phases also present within the stream. For example, a gas may also be present in a "liquid stream." In some instances, the terms "gas stream" and "vapor stream" may be used interchangeably.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure. When used with respect to a subsequent value, the terms may mean plus or minus 10% of the subsequent value unless otherwise indicated.

The disclosure relates to a system and method for sequentially cooling and/or progressively conditioning the sour gas feed stream prior to a cryogenic distillation column. FIGS. 1-9, and particularly FIGS. 6-9, of the disclosure display various aspects of the system and method. The techniques for sequential cooling and/or progressively conditioning the sour gas feed stream described herein may have a variety of benefits. For example, routing moisture rich liquid streams through warmer temperatures in the process mitigates the risk of hydrate formation. Additionally, removal of feed stream liquids at intermediate temperatures also results in lower chilling loads on subsequent chillers, leading to a variety of feed conditioning efficiencies. For example, as warmer liquid enters the cryogenic distillation tower, the reboiler heat requirement decreases. Further, disclosed feed conditioning configurations may result in the generation of lower amounts of liquid at higher acid gas concentrations. Those of skill in the art will appreciate that use of the disclosed techniques described herein, e.g., sequentially cooling and/or progressively conditioning the sour gas feed stream, may also decrease the reboiler heat requirements, reduce the spray rates in the distillation tower, and, correspondingly, reduce the overhead refrigeration requirement.

The system and method may separate a feed stream having methane and contaminants. The system may comprise a distillation tower 104, 204 (FIGS. 1-4). The distillation tower 104, 204 may separate the contaminants from the methane.

In some embodiments not shown in the Figures, the distillation tower 104, 204 may incorporate only two functional sections when the upper section 110 is not needed and/or desired. When the distillation tower does not include an upper section 110, a portion of vapor leaving the middle controlled freeze zone section 108 may be condensed in a condenser 122 and returned as a liquid stream via a spray assembly 129. Moreover, lines 18 and 20 may be eliminated, elements 124 and 126 may be one and the same, and elements 150 and 128 may be one and the same. The stream in line 14, now taking the vapors leaving the middle controlled freeze section 108, directs these vapors to the condenser 122.

In embodiments shown in FIGS. 1-4, the distillation tower 104, 204 may be separated into three functional sections: a lower section 106, a middle controlled freeze zone section 108 and an upper section 110. The distillation tower 104, 204 may incorporate three functional sections when the upper section 110 is needed and/or desired.

The lower section 106 may also be referred to as a stripper section. The middle controlled freeze zone section 108 may also be referred to as a controlled freeze zone section. The upper section 110 may also be referred to as a rectifier section.

Figure 3:
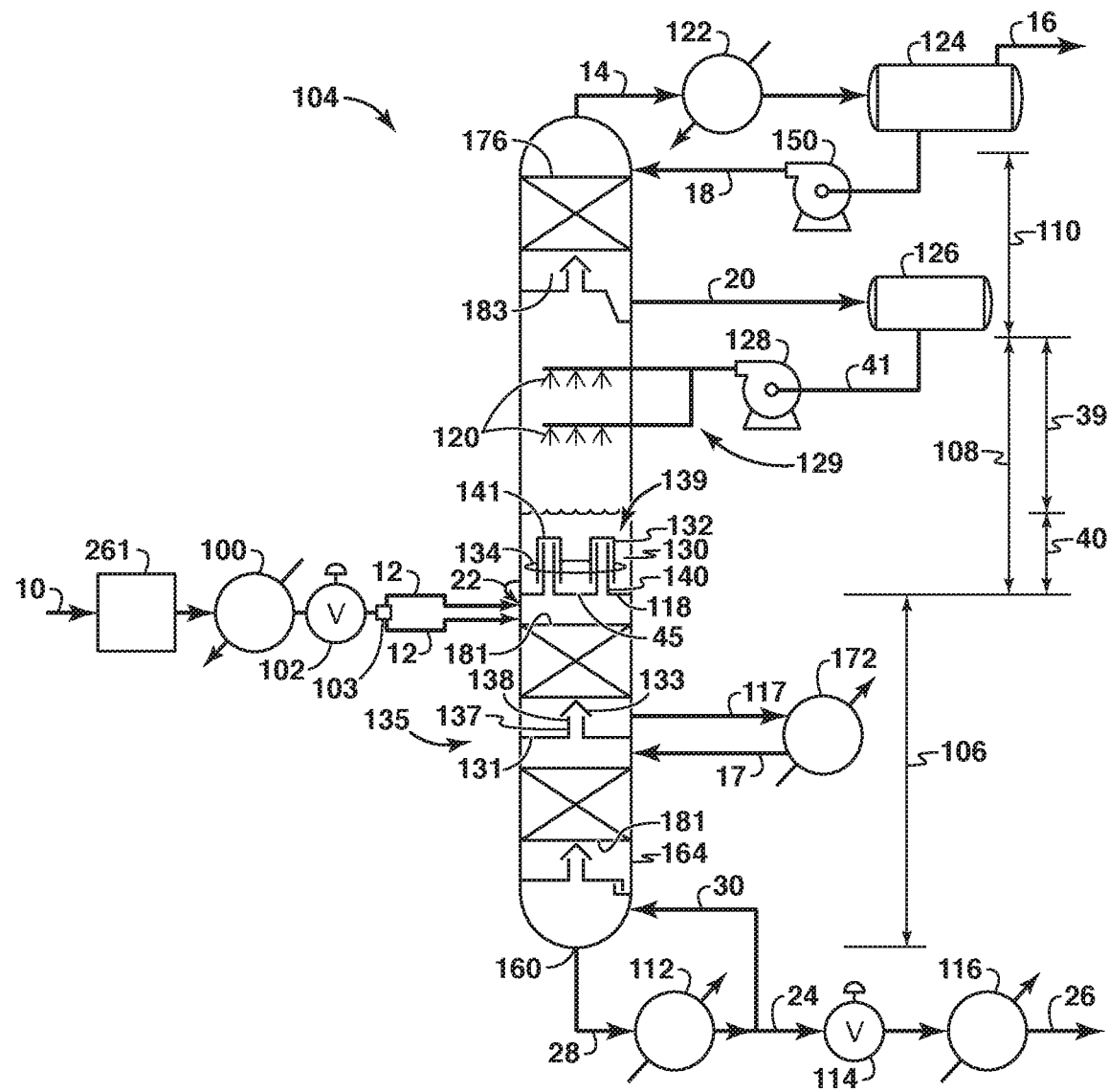
FIG. 3 is a schematic diagram of a tower with sections within a single vessel.

The sections of the distillation tower 104 may be housed within a single vessel (FIGS. 1 and 3). For example, the lower section 106, the middle controlled freeze zone section 108, and the upper section 110 may be housed within a single vessel 164.

Figure 2:
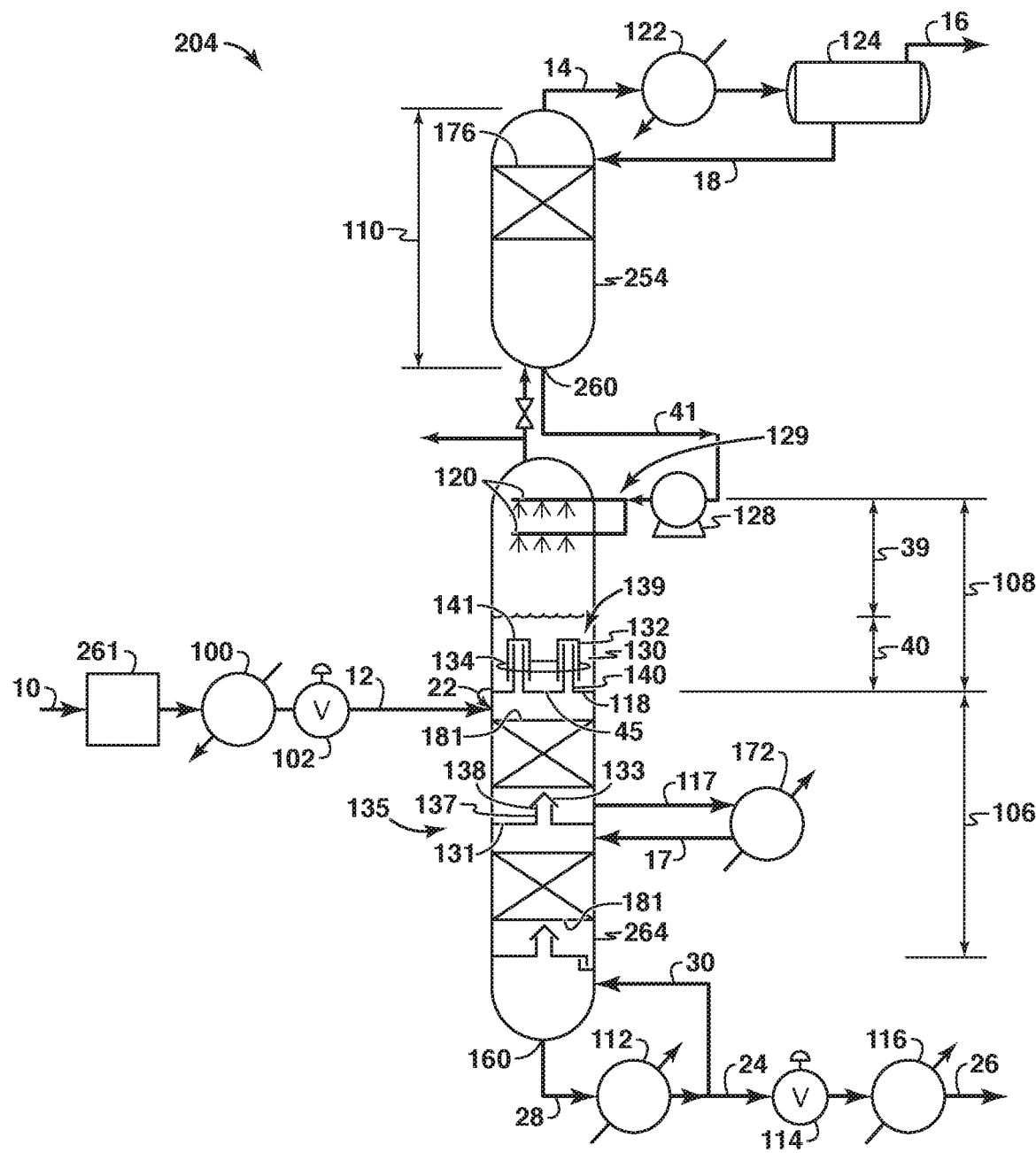
FIG. 2 is a schematic diagram of a tower with sections in multiple vessels.
Figure 4:
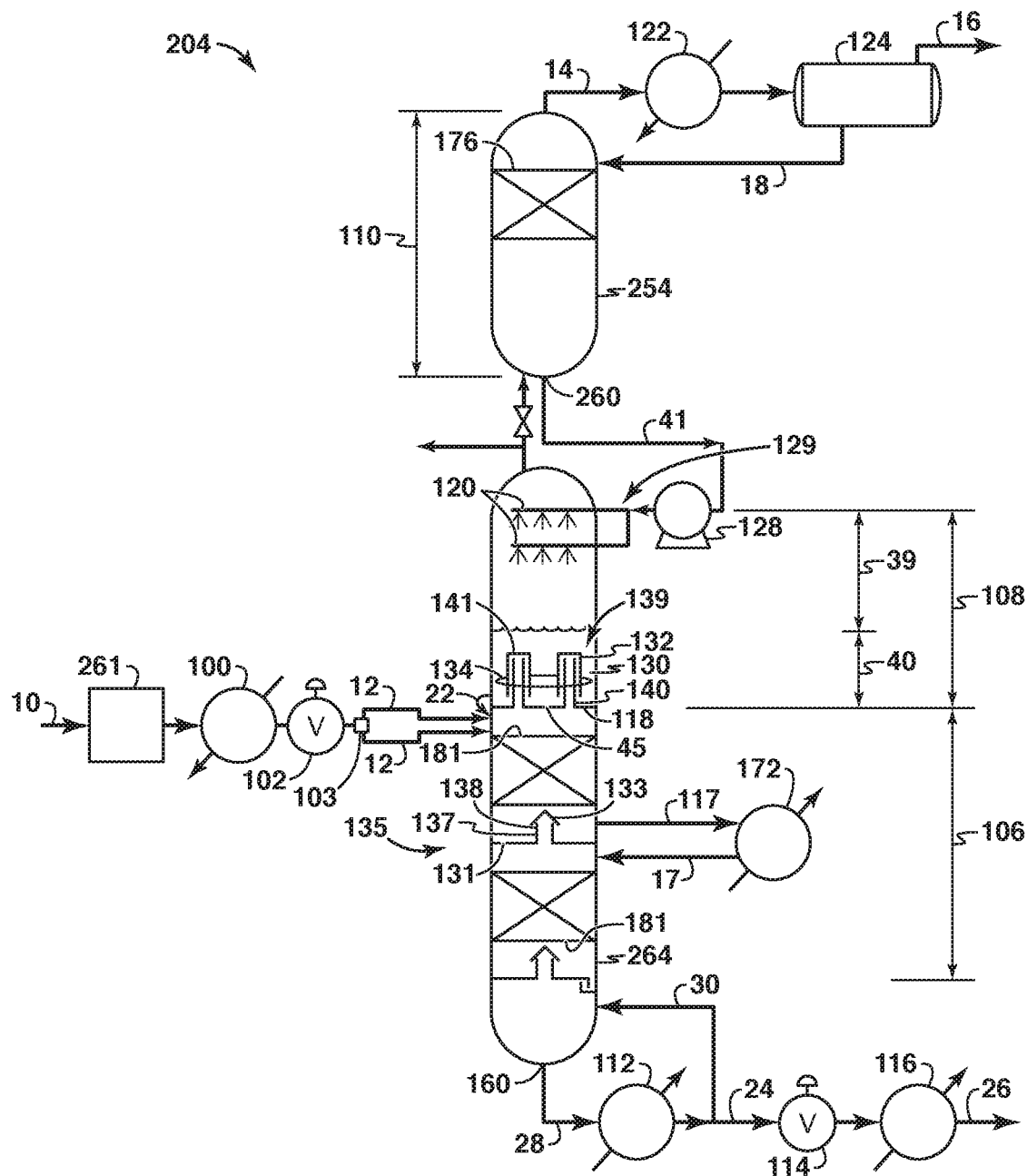
FIG. 4 is a schematic diagram of a tower with sections in multiple vessels.

The sections of the distillation tower 204 may be housed within a plurality of vessels to form a split-tower configuration (FIGS. 2 and 4). Each of the vessels may be separate from the other vessels. Piping and/or another suitable mechanism may connect one vessel to another vessel. In this instance, the lower section 106, middle controlled freeze zone section 108 and upper section 110 may be housed within two or more vessels. For example, as shown in FIGS. 2 and 4, the upper section 110 may be housed within a single vessel 254 and the lower and middle controlled freeze zone sections 106, 108 may be housed within a single vessel 264. When this is the case, a liquid stream exiting the upper section 110, may exit through a liquid outlet bottom 260. The liquid outlet bottom 260 is at the bottom of the upper section 110. Although not shown, each of the sections may be housed within its own separate vessel, or one or more section may be housed within separate vessels, or the upper and middle controlled freeze zone sections may be housed within a single vessel and the lower section may be housed within a single vessel, etc. When sections of the distillation tower are housed within vessels, the vessels may be side-by-side along a horizontal line and/or above each other along a vertical line.

The split-tower configuration may be beneficial in situations where the height of the distillation tower, motion considerations, and/or transportation issues, such as for remote locations, need to be considered. This split-tower configuration allows for the independent operation of one or more sections. For example, when the upper section is housed within a single vessel and the lower and middle controlled freeze zone sections are housed within a single vessel, independent generation of reflux liquids using a substantially contaminant-free, largely hydrocarbon stream from a packed gas pipeline or an adjacent hydrocarbon line, may occur in the upper section. And the reflux may be used to cool the upper section, establish an appropriate temperature profile in the upper section, and/or build up liquid inventory at the bottom of the upper section to serve as an initial source of spray liquids for the middle controlled freeze zone section. Moreover, the middle controlled freeze zone and lower sections may be independently prepared by chilling the feed stream, feeding it to the optimal location be that in the lower section or in the middle controlled freeze zone section, generating liquids for the lower and the middle controlled freeze zone sections, and disposing the vapors off the middle controlled freeze zone section while they are off specification with too high a contaminant content. Also, liquid from the upper section may be intermittently or continuously sprayed, building up liquid level in the bottom of the middle controlled freeze zone section and bringing the contaminant content in the middle controlled freeze zone section down and near steady state level so that the two vessels may be connected to send the vapor stream from the middle controlled freeze zone section to the upper section, continuously spraying liquid from the bottom of the upper section into the middle controlled freeze zone section and stabilizing operations into steady state conditions. The split tower configuration may utilize a sump of the upper section as a liquid receiver for the pump 128, therefore obviating the need for the liquid receiver 126 in FIGS. 1 and 3.

The system may also include a heat exchanger 100 (FIGS. 1-4), e.g., a shell-and-tube heat exchanger, a packed or trayed column, etc. The feed stream 10 may enter the heat exchanger 100 before entering the distillation tower 104, 204. The feed stream 10 may be cooled within the heat exchanger 100. The heat exchanger 100 helps drop the temperature of the feed stream 10 to a level suitable for introduction into the distillation tower 104, 204. As described at length below, any of the feed conditioning system embodiments shown in FIGS. 6-9 may optionally replace the heat exchanger 100.

The system may include an expander device 102 (FIGS. 1-4). The feed stream 10 may enter the expander device 102 before entering the distillation tower 104, 204. The feed stream 10 may be expanded in the expander device 102 after exiting the heat exchanger 100. The expander device 102 helps drop the temperature of the feed stream 10 to a level suitable for introduction into the distillation tower 104, 204. The expander device 102 may be any suitable device, such as a valve. If the expander device 102 is a valve, the valve may be any suitable valve that may aid in cooling the feed stream 10 before it enters the distillation tower 104, 204. For example, the valve 102 may comprise a Joule-Thompson (J-T) valve.

The system may include a feed separator 103 (FIGS. 3-4). The feed stream may enter the feed separator before entering the distillation tower 104, 204. The feed separator may separate a feed stream having a mixed liquid and vapor stream into a liquid stream and a vapor stream. Lines 12 may extend from the feed separator to the distillation tower 104, 204. One of the lines 12 may receive the vapor stream from the feed separator. Another one of the lines 12 may receive the liquid stream from the feed separator. Each of the lines 12 may extend to the same and/or different sections (i.e. middle controlled freeze zone, and lower sections) of the distillation tower 104, 204. The expander device 102 may or may not be downstream of the feed separator 103. The expander device 102 may comprise a plurality of expander devices 102 such that each line 12 has an expander device 102.

The system may include a dehydration unit 261 (FIGS. 1-4). The feed stream 10 may enter the dehydration unit 261 before entering the distillation tower 104, 204. The feed stream 10 enters the dehydration unit 261 before entering the heat exchanger 100 and/or the expander device 102. The dehydration unit 261 removes water from the feed stream 10 to prevent water from later presenting a problem in the heat exchanger 100, expander device 102, feed separator 103, or distillation tower 104, 204. The water can present a problem by forming a separate water phase (i.e., ice and/or hydrate) that plugs lines, equipment or negatively affects the distillation process. The dehydration unit 261 dehydrates the feed stream to a dew point sufficiently low to ensure a separate water phase will not form at any point downstream during the rest of the process. The dehydration unit may be any suitable dehydration mechanism, such as a molecular sieve or a glycol dehydration unit. As described below, any of the feed conditioning system embodiments shown in FIGS. 6-9 may optionally replace the dehydration unit 261.

The system may include a filtering unit (not shown). The feed stream 10 may enter the filtering unit before entering the distillation tower 104, 204. The filtering unit may remove undesirable contaminants from the feed stream before the feed stream enters the distillation tower 104, 204. Depending on what contaminants are to be removed, the filtering unit may be before or after the dehydration unit 261 and/or before or after the heat exchanger 100.

The systems may include a line 12 (FIGS. 1-4). The line may also be referred to as an inlet channel 12. The feed stream 10 may be introduced into the distillation tower 104, 204 through the line 12. The line 12 may extend to the lower section 106 or the middle controlled freeze zone section 108 of the distillation tower 104, 204. For example, the line 12 may extend to the lower section 106 such that the feed stream 10 may enter the lower section 106 of the distillation tower 104, 204 (FIGS. 1-4). The line 12 may directly or indirectly extend to the lower section 106 or the middle controlled freeze zone section 108. The line 12 may extend to an outer surface of the distillation tower 104, 204 before entering the distillation tower 104, 204.

If the system includes the feed separator 103 (FIGS. 3-4), the line 12 may comprise a plurality of lines 12. Each line may be the same line as one of the lines that extends from the feed separator to a specific portion of the distillation tower 104, 204.

The lower section 106 is constructed and arranged to separate the feed stream 10 into an enriched contaminant bottom liquid stream (i.e., liquid stream) and a freezing zone vapor stream (i.e., vapor stream). The lower section 106 separates the feed stream at a temperature and pressure at which no solids form. The liquid stream may comprise a greater quantity of contaminants than of methane. The vapor stream may comprise a greater quantity of methane than of contaminants. In any case, the vapor stream is lighter than the liquid stream. As a result, the vapor stream rises from the lower section 106 and the liquid stream falls to the bottom of the lower section 106.

The lower section 106 may include and/or connect to equipment that separates the feed stream. The equipment may comprise any suitable equipment for separating methane from contaminants, such as one or more packed sections 181, or one or more distillation trays with perforations, downcomers, and weirs (FIGS. 1-4).

The equipment may include components that apply heat to the stream to form the vapor stream and the liquid stream. For example, the equipment may comprise a first reboiler 112 that applies heat to the stream. The first reboiler 112 may be located outside of the distillation tower 104, 204. The equipment may also comprise a second reboiler 172 that applies heat to the stream. The second reboiler 172 may be located outside of the distillation tower 104, 204. Line 117 may lead from the distillation tower to the second reboiler 172. Line 17 may lead from the second reboiler 172 to the distillation tower. Additional reboilers, set up similarly to the second reboiler described above, may also be used.

The first reboiler 112 may apply heat to the liquid stream that exits the lower section 106 through a liquid outlet 160 of the lower section 106. The liquid stream may travel from the liquid outlet 160 through line 28 to reach the first reboiler 112 (FIGS. 1-4). The amount of heat applied to the liquid stream by the first reboiler 112 can be increased to separate more methane from contaminants. The more heat applied by the reboiler 112 to the stream, the more methane separated from the liquid contaminants, though more contaminants will also be vaporized.

The first reboiler 112 may also apply heat to the stream within the distillation tower 104, 204. Specifically, the heat applied by the first reboiler 112 warms up the lower section 106. This heat travels up the lower section 106 and supplies heat to warm solids entering a melt tray assembly 139 (FIGS. 1-4) of the middle controlled freeze zone section 108 so that the solids form a liquid and/or slurry mix.

The second reboiler 172 applies heat to the stream within the lower section 106. This heat is applied closer to the middle controlled freeze zone section 108 than the heat applied by the first reboiler 112. As a result, the heat applied by the second reboiler 172 reaches the middle controlled freeze zone section 108 faster than the heat applied by the first reboiler 112. The second reboiler 172 may also help with energy integration if its heat source is a process stream.

The equipment may include one or more chimney assemblies 135 (FIGS. 1-4). While falling to the bottom of the lower section 106, the liquid stream may encounter one or more of the chimney assemblies 135.

Each chimney assembly 135 includes a chimney tray 131 that collects the liquid stream within the lower section 106. The liquid stream that collects on the chimney tray 131 may be fed to the second reboiler 172. After the liquid stream is heated in the second reboiler 172, the stream may return to the middle controlled freeze zone section 108 to supply heat to the middle controlled freeze zone section 108 and/or the melt tray assembly 139. Unvaporized stream exiting the second reboiler 172 may be fed back to the distillation tower 104, 204 below the chimney tray 131. Vapor stream exiting the second reboiler 172 may be routed under or above the chimney tray 131 when the vapor stream enters the distillation tower 104, 204.

The chimney tray 131 may include one or more chimneys 137. The chimney 137 serves as a channel that the vapor stream in the lower section 106 traverses. The vapor stream travels through an opening in the chimney tray 131 at the bottom of the chimney 137 to the top of the chimney 137. The opening is closer to the bottom of the lower section 106 than it is to the bottom of the middle controlled freeze zone section 108. The top is closer to the bottom of the middle controlled freeze zone section 108 than it is to the bottom of the lower section 106.

Each chimney 137 has attached to it a chimney cap 133. The chimney cap 133 covers a chimney top opening 138 of the chimney 137. The chimney cap 133 prevents the liquid stream from entering the chimney 137. The vapor stream exits the chimney assembly 135 via the chimney top opening 138.

After falling to the bottom of the lower section 106, the liquid stream exits the distillation tower 104, 204 through the liquid outlet 160. The liquid outlet 160 is within the lower section 106 (FIGS. 1-4). The liquid outlet 160 may be located at the bottom of the lower section 106.

After exiting through the liquid outlet 160, the feed stream may travel via line 28 to the first reboiler 112. The feed stream may be heated by the first reboiler 112 and vapor may then re-enter the lower section 106 through line 30. Unvaporized liquid may continue out of the distillation process via line 24.

The system may include an expander device 114 (FIGS. 1-4). After entering line 24, the heated liquid stream may be expanded in the expander device 114. The expander device 114 may be any suitable device, such as a valve. The valve 114 may be any suitable valve, such as a J-T valve.

The system may include a heat exchanger 116 (FIGS. 1-4). The liquid stream heated by the first reboiler 112 may be cooled or heated by the heat exchanger 116. The heat exchanger 116 may be a direct heat exchanger or an indirect heat exchanger. The heat exchanger 116 may comprise any suitable heat exchanger and may output a stream 26.

The vapor stream in the lower section 106 rises from the lower section 106 to the middle controlled freeze zone section 108. The middle controlled freeze zone section 108 is maintained to receive a freezing zone liquid stream to form the solid and the vapor stream (i.e., hydrocarbon-enriched vapor stream) in the middle controlled freeze zone section 108. The middle controlled freeze zone section 108 is constructed and arranged to separate the feed stream 10 introduced into the middle controlled freeze zone section into a solid and a vapor stream. The solid and the vapor stream are formed in the middle controlled freeze zone section 108 when the freezing zone liquid stream is injected into the middle controlled freeze zone section 108 at a temperature and pressure at which the solid and vapor stream form. The solid may be comprised more of contaminants than of methane. The vapor stream may comprise more methane than contaminants.

The middle controlled freeze zone section 108 includes a lower section 40 and an upper section 39. The lower section 40 is below the upper section 39. The lower section 40 directly abuts the upper section 39. The lower section 40 is primarily but may not exclusively be a heating section of the middle controlled freeze zone section 108. The upper section 39 is primarily but may not exclusively be a cooling section of the middle controlled freeze zone section 108. The temperature and pressure of the upper section 39 are chosen so that the solid can form in the middle controlled freeze zone section 108.

The middle controlled freeze zone section 108 may comprise a melt tray assembly 139 that is maintained in the middle controlled freeze zone section 108 (FIGS. 1-5). The melt tray assembly 139 is within the lower section 40 of the middle controlled freeze zone section 108. The melt tray assembly 139 is not within the upper section 39 of the middle controlled freeze zone section 108.

The melt tray assembly 139 is constructed and arranged to melt a solid formed in the middle controlled freeze zone section 108. When the warm vapor stream rises from the lower section 106 to the middle controlled freeze zone section 108, the vapor stream immediately encounters the melt tray assembly 139 and supplies heat to melt the solid. The melt tray assembly 139 may comprise at least one of a melt tray 118, a bubble cap 132, a liquid 130 and heat mechanism(s) 134.

The melt tray 118 may collect a liquid and/or slurry mix. The melt tray 118 divides at least a portion of the middle controlled freeze zone section 108 from the lower section 106. The melt tray 118 is at the bottom 45 of the middle controlled freeze zone section 108.

One or more bubble caps 132 may act as a channel for the vapor stream rising from the lower section 106 to the middle controlled freeze zone section 108. The bubble cap 132 may provide a path for the vapor stream that forces the vapor stream up the riser 140 and then down and around the riser 140 to the melt tray 118. The riser 140 is covered by a cap 141. The cap 141 prevents the liquid 130 from travelling into the riser 140. The cap 141 helps prevent solids from travelling into the riser 140. The vapor stream's traversal through the bubble cap 132 allows the vapor stream to transfer heat to the liquid 130 within the melt tray assembly 139.

One or more heat mechanisms 134 may further heat up the liquid 130 to facilitate melting of the solids into a liquid and/or slurry mix. The heat mechanism(s) 134 may be located anywhere within the melt tray assembly 139. For example, as shown in FIGS. 1-4, a heat mechanism 134 may be located around the bubble caps 132. The heat mechanism 134 may be any suitable mechanism, such as a heat coil. The heat source of the heat mechanism 134 may be any suitable heat source.

The liquid 130 in the melt tray assembly is heated by the vapor stream. The liquid 130 may also be heated by the one or more heat mechanisms 134. The liquid 130 helps melt the solids formed in the middle controlled freeze zone section 108 into a liquid and/or slurry mix. Specifically, the heat transferred by the vapor stream heats up the liquid, thereby enabling the heat to melt the solids. The liquid 130 is at a level sufficient to melt the solids.

The middle controlled freeze zone section 108 may also comprise a spray assembly 129. The spray assembly 129 cools the vapor stream that rises from the lower section 40. The spray assembly 129 sprays liquid, which is cooler than the vapor stream, on the vapor stream to cool the vapor stream. The spray assembly 129 is within the upper section 39. The spray assembly 129 is not within the lower section 40. The spray assembly 129 is above the melt tray assembly 139. In other words, the melt tray assembly 139 is below the spray assembly 129.

The temperature in the middle controlled freeze zone section 108 cools down as the vapor stream travels from the bottom of the middle controlled freeze zone section 108 to the top of the middle controlled freeze zone section 108. The methane in the vapor stream rises from the middle controlled freeze zone section 108 to the upper section 110. Some contaminants may remain in the methane and also rise. The contaminants in the vapor stream tend to condense or solidify with the colder temperatures and fall to the bottom of the middle controlled freeze zone section 108.

The solids form the liquid and/or slurry mix when in the liquid 130. The liquid and/or slurry mix flows from the middle controlled freeze zone section 108 to the lower distillation section 106. The liquid and/or slurry mix flows from the bottom of the middle controlled freeze zone section 108 to the top of the lower section 106 via a line 22 (FIGS. 1-4). The line 22 may be an exterior line. The line 22 may extend from the distillation tower 104, 204. The line 22 may extend from the middle controlled freeze zone section 108. The line may extend to the lower section 106.

The vapor stream that rises in the middle controlled freeze zone section 108 and does not form solids or otherwise fall to the bottom of the middle controlled freeze zone section 108, rises to the upper section 110. The upper section 110 operates at a temperature and pressure and contaminant concentration at which no solid forms. The upper section 110 is constructed and arranged to cool the vapor stream to separate the methane from the contaminants. Reflux in the upper section 110 cools the vapor stream. The reflux is introduced into the upper section 110 via line 18. Line 18 may extend to the upper section 110. Line 18 may extend from an outer surface of the distillation tower 104, 204.

After contacting the reflux in the upper section 110, the feed stream forms a vapor stream and a liquid stream. The vapor stream mainly comprises methane. The liquid stream comprises relatively more contaminants. The vapor stream rises in the upper section 110 and the liquid falls to a bottom of the upper section 110.

To facilitate separation of the methane from the contaminants when the stream contacts the reflux, the upper section 110 may include one or more mass transfer devices 176. Each mass transfer device 176 helps separate the methane from the contaminants. Each mass transfer device 176 may comprise any suitable separation device, such as a tray with perforations, or a section of random or structured packing 176 to facilitate contact of the vapor and liquid phases.

After rising, the vapor stream may exit the distillation tower 104, 204 through line 14. The line 14 may emanate from an upper part of the upper section 110. The line 14 may extend from an outer surface of the upper section 110.

From line 14, the vapor stream may enter a condenser 122. The condenser 122 cools the vapor stream to form a cooled stream. The condenser 122 at least partially condenses the stream.

After exiting the condenser 122, the cooled stream may enter a separator 124. The separator 124 separates the vapor stream into liquid and vapor streams. The separator may be any suitable separator that can separate a stream into liquid and vapor streams, such as a reflux drum.

Once separated, the vapor stream may exit the separator 124 as sales product. The sales product may travel through line 16 for subsequent sale to a pipeline and/or condensation to be liquefied natural gas.

Once separated, the liquid stream may return to the upper section 110 through line 18 as the reflux. The reflux may travel to the upper section 110 via any suitable mechanism, such as a reflux pump 150 (FIGS. 1 and 3) or gravity (FIGS. 2 and 4).

The liquid stream (i.e., freezing zone liquid stream) that falls to the bottom of the upper section 110 collects at the bottom of the upper section 110. The liquid may collect on tray 183 (FIGS. 1 and 3) or at the bottommost portion of the upper section 110 (FIGS. 2 and 4). The collected liquid may exit the distillation tower 104, 204 through line 20 (FIGS. 1 and 3) or outlet 260 (FIGS. 2 and 4). The line 20 may emanate from the upper section 110. The line 20 may emanate from a bottom end of the upper section 110. The line 20 may extend from an outer surface of the upper section 110.

The line 20 and/or outlet 260 connect to a line 41. The line 41 leads to the spray assembly 129 in the middle controlled freeze zone section 108. The line 41 emanates from the holding vessel 126. The line 41 may extend to an outer surface of the middle controlled freeze zone section 108.

The line 20 and/or outlet 260 may directly or indirectly (FIGS. 1-4) connect to the line 41. When the line 20 and/or outlet 260 directly connect to the line 41, the liquid spray may be pumped to the spray nozzle(s) 120 via any suitable mechanism, such as the spray pump 128 or gravity. When the line 20 and/or outlet 260 indirectly connect to the line 41, the lines 20, 41 and/or outlet 260 and line 41 may directly connect to a holding vessel 126 (FIGS. 1 and 3). The holding vessel 126 may house at least some of the liquid spray before it is sprayed by the nozzle(s). The liquid spray may be pumped from the holding vessel 126 to the spray nozzle(s) 120 via any suitable mechanism, such as the spray pump 128 (FIGS. 1-4) or gravity. The holding vessel 126 may be needed when there is not a sufficient amount of liquid stream at the bottom of the upper section 110 to feed the spray nozzles 120.

The method may include maintaining an upper section 110. The upper section 110 operates as previously discussed.

The method may also include separating the feed stream in the upper section 110 as previously discussed. Various lineups, systems, methods, and/or processes using open-loop refrigeration to provide cooling to a distillation system operating under solids forming conditions for at least one of the components in a stream to the distillation system are known in the art, e.g., U.S. Pat. No. 6,053,007, and may optionally be utilized in conjunction with the disclosed techniques as would be understood by those of skill in the art.

Figure 5:
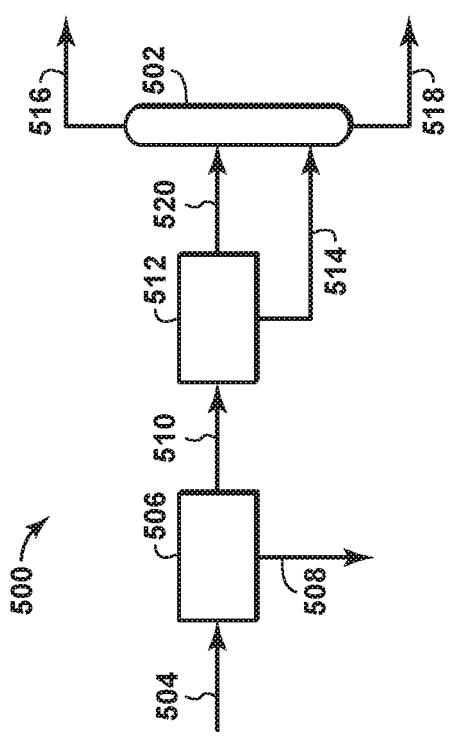
FIG. 5 is a schematic diagram of a feed conditioning configuration.

FIG. 5 is a schematic diagram of a feed conditioning configuration 500 prior to a distillation tower 502, e.g., the tower 104, 204 of FIGS. 1-4, or any other cryogenic distillation tower suitably employable herewith as would be understood by those of skill in the art. The feed conditioning configuration 500 is configured to receive a sour gas feed 504 via a sour gas feed stream header, e.g., the feed stream 10 of FIGS. 1-4. The sour gas feed stream 504 is passed to a dehydration unit 506, e.g., a glycol unit or the dehydration unit 261 of FIGS. 1-4. The dehydration unit 506 may separate the sour gas feed stream 504 into a first stream 508, e.g., a liquid stream and/or a waste stream comprising substantially water, and a partially dehydrated feed stream 510, comprising the feed gas stream having at least a portion of the initial water content removed. The partially dehydrated feed stream 510 is passed to a chiller 512, comprising a heat exchanger 100 of FIG. 1-4. The chiller 512 may separate and/or condense additional contaminants, e.g., some water, carbon dioxide, and/or heavier hydrocarbons (e.g., ethane) if present in sufficient concentration in the feed gas stream, to form a second stream 514, e.g., a condensate stream comprising water. The chiller 512 may feed the second stream 514 to a bottom section of the distillation tower 502, e.g., the lower section 106 of FIGS. 1-4. The chiller 512 may feed any non-condensed stream feed gas 520 to a section of the tower 502, e.g., the middle controlled freeze zone section 108 of FIGS. 1-4. Some embodiments of the configuration 500 may include an expander device, e.g., the expander device 102 of FIGS. 1-4, prior to introducing the feed gas to the tower 502. As discussed above with respect to the expander device 102, the expander device may aid in cooling the feed gas before it enters the distillation tower 502. The tower 502 may separate the conditioned feed stream into an overhead stream 516 comprising methane and/or nitrogen and a stream 518 comprising liquids, e.g., water, carbon dioxide, and/or heavy hydrocarbons.

In operation, the feed conditioning configuration 500 conditions the sour gas feed stream 504 prior to introduction into the tower 502. This may include two general steps: (1) removal of sufficient amounts of moisture to mitigate any concerns of hydrate formation in the colder regions of the process, and (2) chilling the feed to an appropriate temperature before introduction into the process, which minimizes the refrigeration load on the reflux generation system. The bulk of the moisture may be removed at the dehydration unit 506 via the first stream 508. Chilling of the partially dehydrated feed stream 510 may be accomplished at the chiller 512, which may pass the second stream 514 to a bottom section of the distillation tower 502, e.g., the lower section 106 of FIGS. 1-4. Chilling the feed gas stream further forms more liquid condensate. While a higher amount of liquid may be able to dissolve more moisture, lower liquid temperature diminishes the water-carrying capacity of the colder liquid. Additionally, colder liquids have a lower vapor pressure of water above it, so the resulting gas will be drier, but reducing the feed gas stream to the saturation temperature risks forming hydrates. For these reasons, a particular feed conditioning configuration may be chosen based on the costs and benefits in relation to the desired performance metric. Consequently, some embodiments of the present disclosure use a multistage feed chilling train to cool and condition the feed in stages (e.g., FIG. 6). The chiller 512 may feed any non-condensate stream feed gas to a section of the tower 502, e.g., the middle controlled freeze zone section 108 of FIGS. 1-4. Once separated in the tower 502, the overhead stream 516 of treated gas may be sent, e.g., to a pipeline or a LNG train for liquefaction, while the bottom section of the distillation tower 502 may strip out any residual methane and send the resulting acid gas stream 518, e.g., to a spent reservoir for AGI or for use as a miscible EOR fluid.

Figure 6:
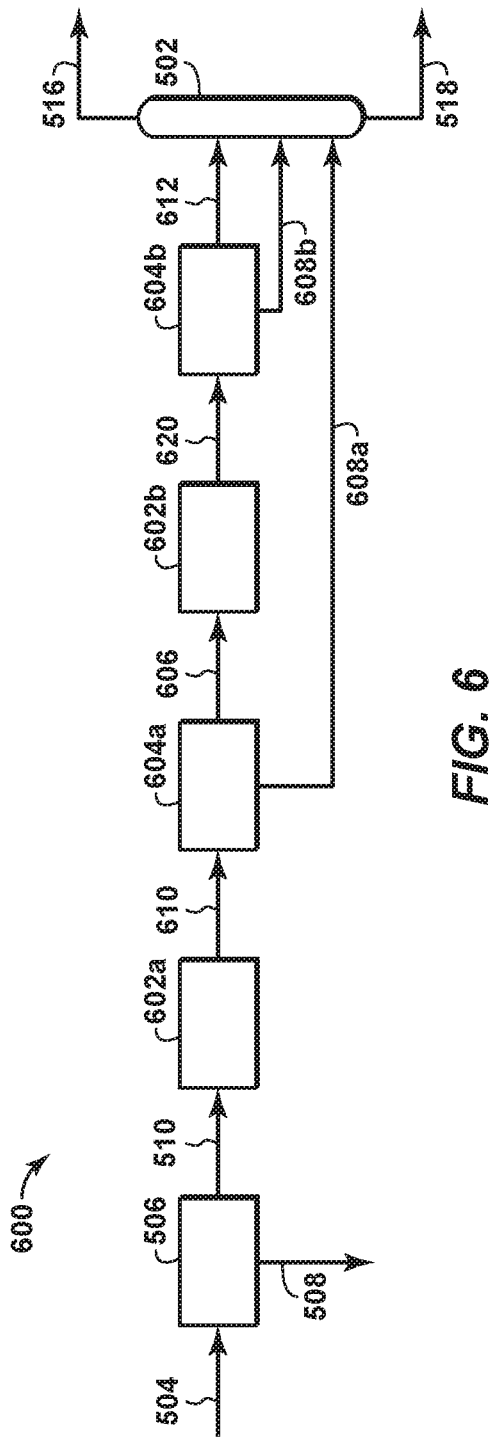
FIG. 6 is a schematic diagram of a first embodiment of a feed conditioning configuration.

FIG. 6 is a schematic diagram of a first embodiment of a feed conditioning configuration 600 prior to a distillation tower 502. The components of FIG. 6 may be the same as the identically numbered components of FIG. 5 except as otherwise noted. The feed conditioning configuration 600 includes a two-stage progressive chilling process or a sequential cooling assembly. The feed conditioning configuration 600 is configured to receive a sour gas via a sour gas feed stream 504. The sour gas feed stream 504 is passed to a dehydration unit 506. The dehydration unit 506 may separate the sour gas feed stream 504 into a first stream 508 comprising substantially water and a partially dehydrated feed stream 510 having the bulk of water removed. The partially dehydrated feed stream 510 is passed to a chiller 602a, e.g., via a receiving header configured to receive the partially dehydrated feed stream 510 from the dehydration unit 506. The chiller 602a may cool the partially dehydrated feed stream 510 to a first temperature and condense at least a portion of the dehydrated feed stream 510. The first temperature may be less than about +30° C., or less than about +25° C., or less than about +20° C., or less than about +15° C., or less than about +10° C. and may be greater than about −40° C., or greater than about −35° C., or greater than about −30° C., or greater than about −25° C., or greater than about −20° C. In some embodiments, the first temperature may be between about +30° C. and about −40° C., or between about +10° C. and −20° C. The partially chilled feed stream 610 may be sent to a separator 604a where it is separated into a methane-rich stream 606 comprising vapor and an acid-gas-rich stream 608a, e.g., a stream comprising liquid or substantially liquid, such as water and/or acid gas. The separator 604a may send the acid-gas-rich stream 608a to a bottom section of the distillation tower 502, e.g., the lower section 106 of FIGS. 1-4, and may send the methane-rich stream 606 to a second stage chiller 602b. The chiller 602b may cool the methane-rich stream 606 to a second temperature and condense at least a portion of the methane-rich stream 606. The second temperature may be less than about −10° C., or less than about −15° C., or less than about −20° C., and may be greater than about −80° C., or greater than about −75° C., or greater than about −70° C., or greater than about −65° C., or greater than about −60° C. In some embodiments, the second temperature may be between about −20° C. and about −80° C., or between about −20° C. and about −60° C. The partially chilled feed stream 610 may be sent to a separator 604b where it is separated into a progressively dehydrated feed stream, i.e., a methane-rich stream 612 comprising vapor or substantially vapor, and an acid-gas-rich stream 608b comprising liquid or substantially liquid. The separator 604b may send the acid-gas-rich stream 608b to a lower section of the distillation tower 502 and may send the methane-rich stream 612 to a section of the tower 502, e.g., the middle controlled freeze zone section 108 of FIGS. 1-4. Some embodiments of the configuration 600 may include an expander device, e.g., the expander device 102 of FIGS. 1-4, prior to introducing one or more of the methane-rich stream 612, the acid-gas-rich stream 608a, or the acid-gas-rich stream 608b to the tower 502. As discussed above with respect to the expander device 102, the expander device may aid in cooling the feed gas before it enters the distillation tower 502. The tower 502 may separate the conditioned feed stream, e.g., the methane-rich stream 612, into an overhead stream 516 comprising methane and/or nitrogen and a stream 518 comprising water, carbon dioxide, and/or heavy hydrocarbons.

As described above, a two-phase stream may be introduced into a separator 604a and/or 604b, e.g., to separate the methane-rich vapor from the acid-gas-rich liquid. Due to the ability of acid gasses (e.g., $CO_2$) to dissolve significant amounts of water at these intermediate temperatures, an appreciable amount of water may be removed along with the liquids in this separator. This process may be repeated with the moisture-lean vapor (e.g., a partially dehydrated feed gas stream) to further remove water from the vapor stream before introduction into the tower 502. The liquid streams coming from the one or more intermediate separators may be combined and introduced into the tower 502 at a different point from the conditioned gas, e.g., at a section of the tower 502, e.g., the lower section 106 of FIGS. 1-4, or into one or more bottom or side reboilers, e.g., the reboilers 112, 172 of FIG. 1-4, which operate at warmer temperature.

The benefits of using a two-stage progressive chilling process or a sequential cooling assembly are many, and include (1) reduction in feed chilling energy requirements due to the reduction in the amount of fluid being chilled, (2) minimizing the risk of heavy hydrocarbons, e.g., benzene, toluene, xylene, etc., freezing during the feed conditioning process, and (3) minimizing the risk of glycol or other material carried over from a dehydration unit freezing during the feed conditioning process.

The above benefits may be due, at least in part, to the ability of acid gasses (particularly carbon dioxide) to hold significant amounts of water at these intermediate temperatures. Because of this ability, a significant amount of water may be removed along with the liquids using the two-stage progressive chilling process or a sequential cooling assembly, e.g., in the separators 604a and/or 604b. Repeating the separation process of separator 604a using the separator 604b may remove more water from the vapor stream than conventional approaches to feed conditioning, which in turn may allow for colder methane-rich stream 612 temperatures, and may reduce the overall cooling load on the feed conditioning configuration 600, e.g., by reducing the stream volume needed to be cooled. Various embodiments of the feed conditioning configurations disclosed herein, e.g., the feed conditioning configurations 600, 700, 800, and/or 900, may remove sufficient moisture to prevent the formation of ice, hydrates, or a combination thereof downstream of the sequential cooling assembly, e.g., in any of the disparate pressure and/or temperature conditions of the cryogenic distillation processes known in the art. In alternate embodiments, the acid-gas-rich streams 608a and/or 608b are combined and introduced into the distillation tower 502 at an intermediate section or side/bottom reboilers.

Further, as described above, routing moisture rich liquid streams, e.g., acid-gas-rich streams 608a and/or 608b, through warmer temperatures in the process may mitigate the risk of hydrate formation or the freezing of heavy hydrocarbons and/or glycol. Additionally, removal of liquid at intermediate temperatures may also result in lower chilling loads on subsequent chillers, leading to improved efficiencies.

As a result of the above benefits, the feed conditioning configurations described herein may yield less dissolved methane and higher acid gas concentrations in the liquid streams entering the tower 502, resulting in higher water carrying capacities, lower reboiler loads, and, correspondingly, lower distillation tower 502 spray rates. Preliminary calculations indicate that the feed conditioning configuration shown in FIG. 6 has the ability to handle higher moisture content in the feed stream 504, when compared to the feed conditioning configuration shown in FIG. 5, e.g., 1.8 times higher moisture content for some feed compositions. Additionally, the configuration shown in FIG. 6 reduced the feed refrigeration requirements when compared to the configuration shows in FIG. 5, e.g., a potential savings of nearly 10% in chilling train refrigeration duty for some feed compositions. The ability to process higher moisture content flows, requiring lower chilling capacities, and options for heat integration are particular benefits of this embodiment. In alternate embodiments, static mixers or "turbulators" may be used in the chillers to facilitate water vapor absorption into the acid gas liquid.

Figure 7:
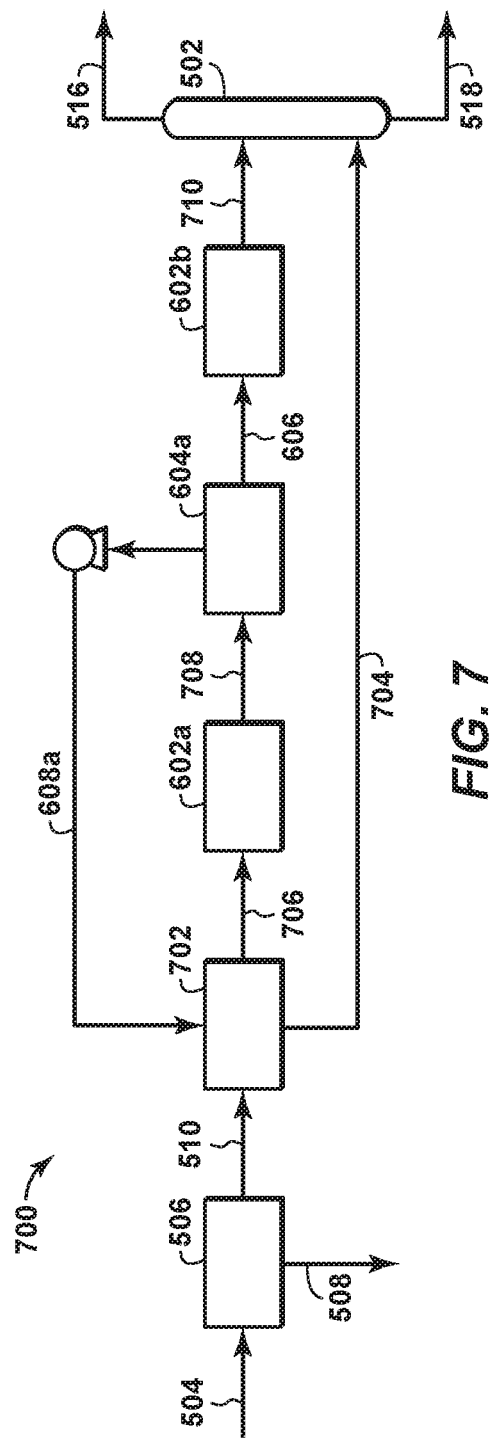
FIG. 7 is a schematic diagram of a second embodiment of a feed conditioning configuration.

FIG. 7 is a schematic diagram of a second embodiment of a feed conditioning configuration 700 prior to a distillation tower 502. The components of FIG. 7 may be the same as the identically numbered components of FIGS. 5-6 except as otherwise noted. The feed conditioning configuration 700 includes a direct-contact recycle dehydration process. The feed conditioning configuration 700 is configured to receive a sour gas via a sour gas feed stream 504. The sour gas feed stream 504 is passed to a dehydration unit 506. The dehydration unit 506 may separate the sour gas feed stream 504 into a first stream 508 comprising substantially water and a partially dehydrated feed stream 510 having the bulk of water removed. The partially dehydrated feed stream 510 is passed to a scrubber 702. A chiller (not shown) may cool the stream before entering the scrubber 702. For example, the chiller may cool the stream to a temperature that is less than about +30° C., or less than about +25° C., or less than about +20° C., and that is greater than about −10° C., or greater than about −5° C., or greater than 0° C. In some embodiments, the chiller may cool the stream to a temperature between about +30° C. and about −10° C., or between about +20° C. and about 0° C. In the scrubber 702 moisture is removed from the partially dehydrated feed stream 510 to create a first stream 704, e.g., a wet liquid stream, which may contain a significant amount of water, some heavy hydrocarbons, e.g., ethane, propane, etc., or acid gas components, or any combination thereof. The scrubber 702 may also create a partially dehydrated stream 706 having at least a portion of the moisture removed. The scrubber 702 may pass the first stream 704 to a bottom section of the distillation tower 502, e.g., the lower section 106 of FIGS. 1-4, and may send the partially dehydrated stream 706 to a chiller 602a. The chiller 602a may chill the partially dehydrated stream 706 to a first intermediate temperature, thereby condensing at least a portion of the partially dehydrated stream 706 and creating a two-phase stream 708. The first intermediate temperature may be less than about +30° C., or less than about +25° C., or less than about +20° C., or less than about +15° C., or less than about +10° C. and may be greater than about −40° C., or greater than about −35° C., or greater than about −30° C., or greater than about −25° C., or greater than about −20° C. In some embodiments, the first intermediate temperature may be between about +30° C. and about −40°

C., or between about +10° C. and −20° C. The chiller 602a may send the two-phase stream 708 to a separator 604a. The separator 604a separates the two-phase stream 708 into a methane-rich stream 606 and an acid-gas-rich stream 608a. The separator 604a may return the acid-gas-rich stream 608a as a recycle stream to the scrubber 702, e.g., to facilitate dehydration, and may send the methane-rich stream 606 to a second stage chiller 602b. The chiller 602b may cool the methane-rich stream 606 to a second intermediate temperature, creating a two-phase stream 710. The second intermediate temperature may be less than about −10° C., or less than about −15° C., or less than about −20° C., and may be greater than about −80° C., or greater than about −75° C., or greater than about −70° C., or greater than about −65° C., or greater than about −60° C. In some embodiments, the second intermediate temperature may be between about −20° C. and about −80° C., or between about −20° C. and about −60° C. The two-phase stream 710 may be separated into a substantially vapor and substantially liquid stream in a separator (not shown) and introduced to a section of the tower 502, e.g., the middle controlled freeze zone section 108 of FIGS. 1-4. Alternatively, the liquid stream may be recycled back to the scrubber 702, or another scrubber in the feed conditioning train. Some embodiments of the configuration 700 may include an expander device, e.g., the expander device 102 of FIGS. 1-4, prior to introducing the chilled stream 710, the first stream 704, or both to the tower 502. As discussed above with respect to the expander device 102, the expander device may aid in cooling the feed gas before it enters the distillation tower 502. The tower 502 may separate the conditioned feed stream, e.g., the chilled methane-rich stream 710, into an overhead stream 516 comprising methane and/or nitrogen and a stream 518 comprising water, carbon dioxide, and/or heavy hydrocarbons.

The feed conditioning configuration 700 may utilize a direct-contact process, e.g., a packed or trayed column, in the scrubber 702. Utilizing a direct-contact process may allow additional moisture to be removed from the sour gas stream over certain prior art processes. Unlike certain prior art processes, the sour gas feed stream 504 in the present embodiment may contain non-negligible amounts of hydrocarbons. The post-scrub process liquid exiting the scrubber 702 may be combined with the first stream 704, e.g., the wet liquid stream, and introduced into the bottoms of the tower 502.

Figure 8:
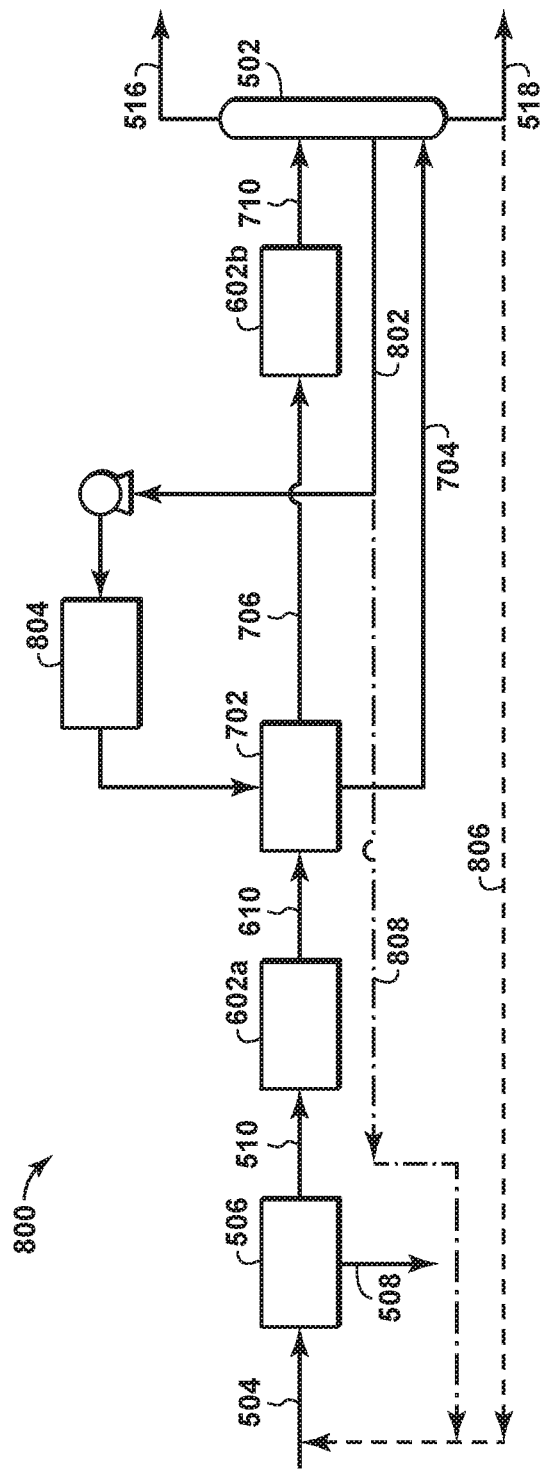
FIG. 8 is a schematic diagram of a third embodiment of a feed conditioning configuration.

FIG. 8 is a schematic diagram of a third embodiment of a feed conditioning configuration 800 prior to a distillation tower 502. The components of FIG. 8 may be the same as the identically numbered components of FIGS. 5-7 except as otherwise noted. The feed conditioning configuration 800 includes a side-draw recycle dehydration process. The feed conditioning configuration 800 is configured to receive a sour gas via a sour gas feed stream 504. The sour gas feed stream 504 is passed to a dehydration unit 506. The dehydration unit 506 may separate the sour gas feed stream 504 into a first stream 508 comprising substantially water and a partially dehydrated feed stream 510 having at least a portion of the water removed. The partially dehydrated feed stream 510 is passed to a chiller 602a. The chiller 602a may cool the partially dehydrated feed stream 510 to a first intermediate temperature, which may condense at least a portion of the dehydrated feed stream 510 when $CO_2$ concentration is sufficient, creating a partially chilled feed stream 610. The first intermediate temperature may be less than about +30° C., or less than about +25° C., or less than about +20° C., or less than about +15° C., or less than about +10° C. and may be greater than about −40° C., or greater than about −35° C., or greater than about −30° C., or greater than about −25° C., or greater than about −20° C. In some embodiments, the first intermediate temperature may be between about +30° C. and about −40° C., or between about +10° C. and −20° C. The partially chilled feed stream 610 may be sent to a scrubber 702, where moisture may be removed from the partially dehydrated feed stream 610 to create a first stream 704, e.g., a wet liquid stream, and a partially dehydrated stream 706 having additional moisture removed. The scrubber 702 may pass the first stream 704 to a bottom section of the distillation tower 502, e.g., the lower section 106 of FIGS. 1-4, and may send the partially dehydrated stream 706 to a chiller 602b. The chiller 602b may cool the partially dehydrated stream 706 to a second intermediate temperature, creating a two-phase stream 710, and may send the two-phase stream 710 to a section of the tower 502, e.g., the middle controlled freeze zone section 108 of FIGS. 1-4. The second intermediate temperature may be less than about −10° C., or less than about −15° C., or less than about −20° C., and may be greater than about −80° C., or greater than about −75° C., or greater than about −70° C., or greater than about −65° C., or greater than about −60° C. In some embodiments, the second intermediate temperature may be between about −20° C. and about −80° C., or between about −20° C. and about −60° C. Some embodiments of the configuration 800 may include an expander device, e.g., the expander device 102 of FIGS. 1-4, prior to introducing the chilled stream 710, the first stream 704, or both to the tower 502. As discussed above with respect to the expander device 102, the expander device may aid in cooling the feed gas before it enters the distillation tower 502. The tower 502 may separate the conditioned feed stream, e.g., the methane-rich stream 710, into an overhead stream 516 comprising methane and/or nitrogen and a stream 518 comprising water, carbon dioxide, and/or heavy hydrocarbons.

The configuration 800 further includes a side-draw recycle system that may take a liquid stream 802 from an intermediate location in the tower 502 bottoms section, and may pass the liquid stream 802 through a heat exchanger 804 to the scrubber 702. In some embodiments, a stream comprising significant amounts of acid gas, e.g., the liquid stream 802, the stream 518, or both, may be recycled and/or recirculated and mixed with the feed entering the feed conditioning system, e.g., via the sour gas feed stream 504, as indicated by the dashed lines 806 and 808, respectively. Alternate mixing sites in the configuration 800 may be optionally selected depending on the desired operating characteristics of the configuration 800. Mixing the comparatively high $CO_2$ and/or $H_2S$ slip stream with the feed stream may increase the concentration of these components as the stream passes through the feed conditioning configuration 800. This increase in acid gas concentrations in the feed conditioning configuration 800, and particularly in the chilling train, may result in a greater amount of liquid to condense, resulting in a greater amount of moisture removed from the conditioned stream and ultimately the chilled stream 710 entering the tower 502. Those of skill in the art will appreciate that while the slip stream, side-draw, and/or other recycle embodiments may increase the feed refrigeration load experienced by the feed conditioning configuration 800, it may nonetheless be desirable in some contexts, e.g., when the increase in feed refrigeration load is offset by the energy and/or capital savings due to relaxation of the feed moisture specification. Thus, the internal heat exchange between the side-draw and the "wet" liquid, i.e., the partially chilled feed stream 610, may increase the efficiency of the configuration 800 in some low feed acid gas situations where less liquid may be generated during the feed chilling process.

Figure 9:
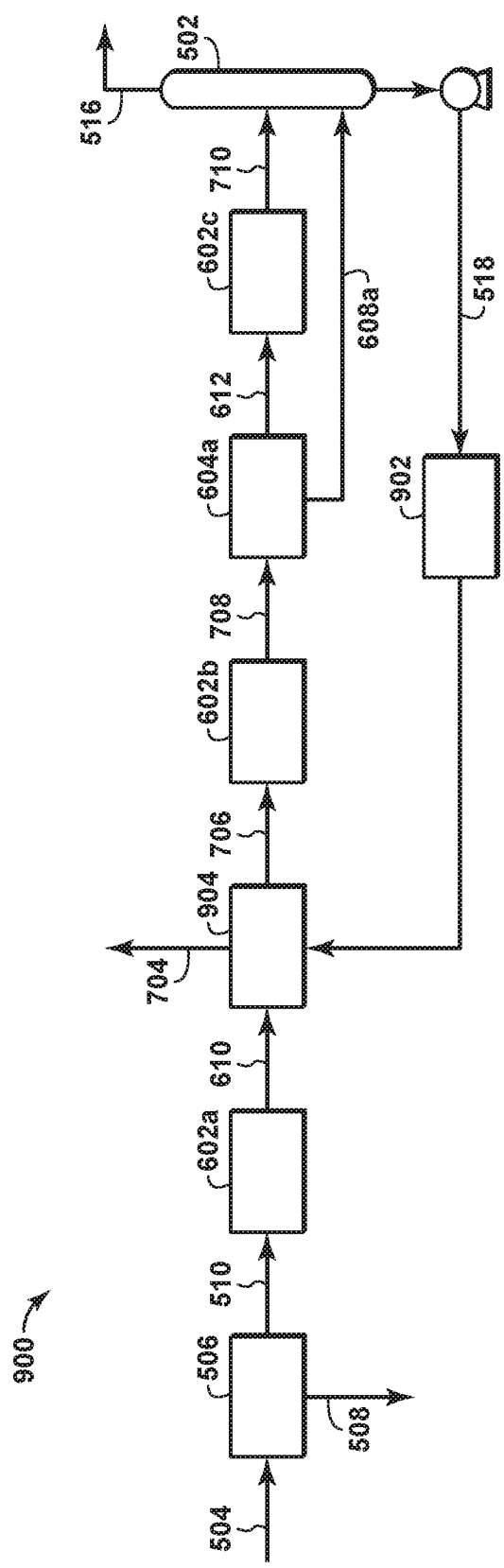
FIG. 9 is a schematic diagram of a fourth embodiment of a feed conditioning configuration.

Additionally, in embodiments having a side-draw, slip stream, or other feature for recycling downstream fluids e.g., the acid-gas-rich stream 608a of the feed conditioning configuration 600 of FIG. 6, the stream 518 of FIG. 9, etc., incorporated into the feed conditioning configuration, the recycle stream may function as a tool for upset recovery. When there are indications of an upset condition, e.g., temporary ice and/or hydrate formation, as may happen near the coldest region of the feed conditioning configuration, the upset recovery technique may be optionally and/or temporarily employed. Specifically, a stream containing a comparatively greater amounts of acid gas, e.g., $CO_2$ and/or $H_2S$, may be recycled and introduced or contacted upstream in the feed conditioning configuration, thereby introducing a dryer and/or warmer stream for dislodging any accumulated hydrates. Once the upset has been recovered and/or eliminated, the upset recovery tool may be secured.

FIG. 9 is a schematic diagram of a fourth embodiment of a feed conditioning configuration 900 prior to a distillation tower 502. The components of FIG. 9 may be the same as the identically numbered components of FIGS. 5-8 except as otherwise noted. The feed conditioning configuration 900 includes a heavy hydrocarbon removal and dehydration process. The feed conditioning configuration 900 is configured to receive a sour gas via a sour gas feed stream 504. The sour gas feed stream 504 is passed to a dehydration unit 506. The dehydration unit 506 may separate the sour gas feed stream 504 into a first stream 508 comprising substantially water and a partially dehydrated feed stream 510 having the bulk of water removed. The partially dehydrated feed stream 510 is passed to a chiller 602a. The chiller 602a may cool the partially dehydrated feed stream 510 to a first intermediate temperature, e.g., condensing at least a portion of the dehydrated feed stream 510 and creating a partially chilled feed stream 610. The first intermediate temperature may be less than about +30° C., or less than about +25° C., or less than about +20° C., or less than about +15° C., or less than about +10° C. and may be greater than about −40° C., or greater than about −35° C., or greater than about −30° C., or greater than about −25° C., or greater than about −20° C. In some embodiments, the first intermediate temperature may be between about +30° C. and about −40° C., or between about +10° C. and −20° C. The partially chilled feed stream 610 may be sent to a heavy hydrocarbon recovery column 904 where moisture may be removed from the partially dehydrated feed stream 610. The heavy hydrocarbon recovery column 904 may create a first stream 704, e.g., a wet liquid stream, which may contain a significant amount of moisture, some heavy hydrocarbons, e.g., propane, and/or acid gas components, or any combination thereof. The heavy hydrocarbon recovery column 904 may also create a partially dehydrated stream 706 having additional moisture removed. The heavy hydrocarbon recovery column 904 may send the first stream 704 out of the configuration 900 and may send the partially dehydrated stream 706 to a chiller 602b. The chiller 602b may further chill the partially dehydrated stream 706 to a second intermediate temperature, condensing at least a portion of the partially dehydrated stream 706 and creating a two-phase stream 708. The second intermediate temperature may be less than about +30° C., or less than about +25° C., or less than about +20° C., or less than about +15° C., or less than about +10° C. and may be greater than about −40° C., or greater than about −35° C., or greater than about −30° C., or greater than about −25° C., or greater than about −20° C. In some embodiments, the second intermediate temperature may be between about +30° C. and about −40° C., or between about +10° C. and −20° C. The chiller 602b may send a two-phase stream 708 to a separator 604a where the two-phase stream 708 may be separated into a methane-rich stream 612 comprising substantially vapor and an acid-gas-rich stream 608a comprising substantially liquid. The separator 604a may send the acid-gas-rich stream 608a to a bottom section of the distillation tower 502 and may send the methane-rich stream 612 to a second stage chiller 602c, e.g., a chiller 602a or 602b of FIG. 6. The chiller 602c may cool the methane-rich stream 612 to a third intermediate temperature, creating a chilled methane-rich stream 710, and may send the chilled methane-rich stream 710 to a section of the tower 502, e.g., the middle controlled freeze zone section 108 of FIGS. 1-4. The third intermediate temperature may be less than about −10° C., or less than about −15° C., or less than about −20° C., and may be greater than about −80° C., or greater than about −75° C., or greater than about −70° C., or greater than about −65° C., or greater than about −60° C. In some embodiments, the third intermediate temperature may be between about −20° C. and about −80° C., or between about −20° C. and about −60° C. Some embodiments of the configuration 900 may include an expander device, e.g., the expander device 102 of FIGS. 1-4, prior to introducing the methane-rich stream 710, the acid-gas-rich stream 608a, or both to the tower 502. As discussed above with respect to the expander device 102, the expander device may aid in cooling the feed gas before it enters the distillation tower 502. The tower 502 may separate the conditioned feed stream, e.g., the chilled methane-rich stream 710, into an overhead stream 516 comprising methane and/or nitrogen and a stream 518 comprising water, carbon dioxide, and/or heavy hydrocarbons. The stream 518 may be cooled using a heat exchanger 902, e.g., a heat exchanger 100 of FIGS. 1-4, and introduced into the heavy hydrocarbon recovery column 904 to further remove moisture. In an alternative embodiment, liquid stream 518, comprising significant amounts of acid gas, e.g., $CO_2$ and/or $H_2S$, may be passed from the tower 502 and recycled and/or recirculated and mixed with the feed entering the feed conditioning system, e.g., via the sour gas feed stream 504. Mixing the comparatively high $CO_2$ and/or $H_2S$ slip stream with the feed stream may increase the concentration of these components as the stream passes through the feed conditioning configuration 900. This increase in acid gas concentrations in the feed conditioning configuration 900, and particularly in the chilling train, may result in a greater amount of liquid to condense, resulting in a greater amount of moisture removed from the conditioned stream and ultimately the chilled stream 710 entering the tower 502. Those of skill in the art will appreciate that while the slip stream, side-draw, and/or other recycle embodiments may increase the feed refrigeration load experienced by the feed conditioning configuration 900, it may nonetheless be desirable in some contexts, e.g., when the increase in feed refrigeration load is offset by the energy and/or capital savings due to relaxation of the feed moisture specification.

Those of skill in the art will appreciate that a two-stage progressive chilling process or a sequential cooling assembly described above may not be available in certain contexts, and, consequently, only one stage of refrigeration may be available. In such cases, alternate embodiments of the feed conditioning configurations 600, 700, 800, and/or 900 may still be achieved using a multi-pass heat exchanger, e.g., a brazed aluminum heat exchanger, to obtain the desired heat exchange between the feed gas and the feed refrigerant. Using a multi-pass heat exchanger in this manner, the feed gas may be drawn out of the heat exchanger during conditioning at an intermediate temperature and separated into a liquid stream and a vapor stream. The vapor stream produced in this manner may be returned for further chilling. The liquid stream produced in this manner may be introduced either into the tower 502 either directly, as in feed conditioning configurations 600 and 900, or indirectly, as in feed conditioning configurations 700 and 800. These and other variations will be apparent to those of skill in the art.

It is important to note that the steps described above in connection with FIGS. 5-9 are provided for illustrative purposes only and a particular step may not be required to perform the inventive methodology. Moreover, FIGS. 5-9 may not illustrate all the steps that may be performed. The claims, and only the claims, define the inventive system and methodology.

Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. The disclosed methodologies and techniques may be used in extracting hydrocarbons from a subsurface region and processing the hydrocarbons. Hydrocarbons and contaminants may be extracted from a reservoir and processed. The hydrocarbons and contaminants may be processed, for example, in the distillation tower previously described. After the hydrocarbons and contaminants are processed, the hydrocarbons may be extracted from the processor, such as the distillation tower, and produced. The contaminants may be discharged into the Earth, etc. For example, as shown in FIGS. 5-9, the method for producing hydrocarbons may include producing the hydrocarbon-enriched vapor stream extracted from the distillation tower. The method may also include removing the hydrocarbon-enriched vapor stream from the distillation tower before producing the hydrocarbon-enriched vapor stream. The initial hydrocarbon extraction from the reservoir may be accomplished by drilling a well using hydrocarbon drilling equipment. The equipment and techniques used to drill a well and/or extract these hydrocarbons are well known by those skilled in the relevant art. Other hydrocarbon extraction activities and, more generally, other hydrocarbon management activities, may be performed according to known principles.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A system for conditioning a sour gas feed stream for a cryogenic distillation tower, comprising:
   a dehydration unit configured to separate the sour gas feed stream into a first stream comprising water and a feed stream;
   a first chiller configured to cool the feed stream into a partially cooled feed stream;
   a scrubber configured to separate the partially cooled feed stream into a cooled feed stream and a liquid stream comprising acid gas;
   a line connected to the scrubber or to a sour gas feed stream line for supplying a recycle stream to the scrubber or to the sour gas feed stream line, wherein the recycle stream is an acid-rich gas and comprises
      a stream from an outlet of a bottom section of the cryogenic distillation tower, or
      a slip stream from an intermediate location in the bottom section of the cryogenic distillation tower,
      wherein the recycle stream is received by the scrubber or the sour gas feed stream during an upset event in which ice and/or hydrates have formed upstream of the cryogenic distillation tower;
   and
   a second chiller configured to further cool the cooled feed stream to form a chilled stream that is directed to a cryogenic distillation tower feed inlet;
   wherein the scrubber is configured to send the liquid stream to a bottom section of the cryogenic distillation tower.

2. The system of claim 1, wherein when the recycle stream is connected to the scrubber, a heat exchanger is disposed along the recycle stream between the cryogenic distillation tower bottom section outlet and the scrubber.

3. The system of claim 1, wherein the temperature of the partially cooled feed stream is between about +10° C. to about −60° C. and the temperature of the chilled stream is between about −10° C. to about −60° C.

4. The system of claim 1, wherein the cryogenic distillation tower comprises a controlled freeze zone section.

5. A method of sequentially cooling a sour gas feed stream for a cryogenic distillation tower, comprising:
   receiving the sour gas feed stream;
   separating the sour gas feed stream into a water stream and a partially dehydrated feed stream;
   cooling the partially dehydrated feed stream to a first temperature;
   in a scrubber, separating the partially dehydrated feed stream into a partially cooled feed stream comprising vapor and a first stream comprising liquid;
   cooling the partially cooled feed stream to a second temperature, thereby forming a cooled feed stream;
   feeding the cooled feed stream to the cryogenic distillation tower; and
   mixing an acid-gas-rich liquid recycle stream into the scrubber or into the sour gas feed stream, wherein the acid-gas-rich liquid recycle stream originates at least in part from a bottom section of the cryogenic distillation tower or downstream of the cryogenic distillation tower;
   wherein the mixing step is part of an upset recovery technique, and further comprising temporarily employing the upset recovery technique to recover from or eliminate an upset condition in which ice and/or hydrates have formed upstream of the cryogenic distillation tower.

6. The method of claim 5, wherein the first stream comprises carbon dioxide.

7. The method of claim 5, further comprising cooling the cooled feed stream to a third temperature prior to feeding the cooled feed stream to the cryogenic distillation tower.

8. The method of claim 5, wherein the acid-gas-rich liquid recycle stream passes through a scrubber before being mixed with the partially cooled feed stream.

9. The method of claim 5, wherein the first stream is sent to a bottom section of the cryogenic distillation tower.

10. A cryogenic distillation system, comprising:
a progressive conditioning section for a sour gas feed stream, comprising:
a dehydration unit configured to separate the sour gas feed stream into a first stream comprising water and a partially dehydrated feed stream;
a first chiller configured to cool, to a first temperature, the partially dehydrated feed stream, thereby forming a partially cooled feed stream;
a scrubber coupled to the first chiller and configured to separate the partially dehydrated feed stream into a cooled feed stream comprising a hydrocarbon and a liquid stream comprising an acid gas;
a second chiller coupled to the chiller and further configured to cool the cooled feed stream to a second temperature to form a chilled stream, wherein the second temperature is colder than the first temperature;
a cryogenic distillation tower comprising a controlled freeze zone, wherein the cryogenic distillation tower is configured to receive the chilled stream; and
a recycle stream connected to the scrubber or to the sour gas feed stream, wherein the recycle stream is an acid gas and comprises
a stream from an outlet of a bottom section of the cryogenic distillation tower, or
a slip stream from an intermediate location in the bottom section of the cryogenic distillation tower,
wherein the recycle stream is received by the scrubber or the sour gas feed stream during an upset event in which ice and/or hydrates have formed in the progressive conditioning section.

11. The system of claim 10, wherein the third stage assembly is further configured to split the progressively dehydrated feed stream into a cooled feed stream comprising a hydrocarbon and a third stream comprising an acid gas, and wherein the second stage assembly, the third stage assembly, or both are coupled to a bottom section of the cryogenic distillation tower.

12. The system of claim 10, further comprising a fourth stage assembly configured to cool the cooled feed stream to a third temperature, wherein the third temperature is colder than the second temperature.

* * * * *

UNITED STATES PATENT AND TRADEMARK OFFICE
CERTIFICATE OF CORRECTION

PATENT NO. : 10,495,379 B2  
APPLICATION NO. : 15/534358  
DATED : December 3, 2019  
INVENTOR(S) : Ananda K. Nagavarapu et al.

Page 1 of 1

It is certified that error appears in the above-identified patent and that said Letters Patent is hereby corrected as shown below:

(71) Applicants: "James A. Valencia" should be changed to "Jaime A. Valencia"

(72) Inventors: "James A. Valencia" should be changed to "Jaime A. Valencia"

Signed and Sealed this  
Tenth Day of March, 2020

Andrei Iancu  
*Director of the United States Patent and Trademark Office*